US012792539B2

(12) United States Patent
Kasichainula et al.

(10) Patent No.: US 12,792,539 B2
(45) Date of Patent: Nov. 10, 2026

(54) METHOD FOR NETWORK INTERFACE CARD (NIC) HAVING INSTRUCTION FOR DELAYING DELIVERY OF AN INTERRUPT TO CPU BASED ON TYPE OF TRAFFIC CLASS OF RECEIVED PACKET

(71) Applicant: Intel Corporation, Santa Clara, CA (US)

(72) Inventors: Kishore Kasichainula, Phoenix, AZ (US); Kshitij Arun Doshi, Tempe, AZ (US); Francesc Guim Bernat, Barcelona (ES)

(73) Assignee: Intel Products IP LLC, Santa Clara, CA (US)

( * ) Notice: Subject to any disclaimer, the term of this patent is extended or adjusted under 35 U.S.C. 154(b) by 56 days.

(21) Appl. No.: 17/900,326

(22) Filed: Aug. 31, 2022

(65) Prior Publication Data

US 2022/0414037 A1 Dec. 29, 2022

(51) Int. Cl.
*G06F 13/00* (2006.01)
*G06F 9/4401* (2018.01)
*G06F 13/26* (2006.01)
*G06F 13/28* (2006.01)

(52) U.S. Cl.
CPC ............ *G06F 13/26* (2013.01); *G06F 9/4418* (2013.01); *G06F 13/28* (2013.01)

(58) Field of Classification Search
CPC ......... G06F 13/26; G06F 13/28; G06F 9/4401
See application file for complete search history.

(56) References Cited

U.S. PATENT DOCUMENTS 5,717,932 A * 2/1998 Szczepanek ............ G06F 13/24 713/502
6,389,526 B1 * 5/2002 Keller ..................... G06F 13/24 712/30
8,612,658 B1 * 12/2013 Lachwani ............... G06F 13/24 710/262
9,542,345 B2 * 1/2017 Cheshire ................. G06F 13/24
11,425,196 B1 * 8/2022 Sivakumar .............. H04L 67/61
11,436,040 B2 * 9/2022 Shrivastava .......... G06F 9/4812
(Continued)

OTHER PUBLICATIONS

Stephen J. Bigelow, "What is IT/OT convergence? Everything you need to know," Article, Tech Target, Aug. 19, 2021, 6 pages, (retrieved on Mar. 8, 2023, https://www.techtarget.com/searchitoperations/definition/IT-OT-convergence).

*Primary Examiner* — Tammara R Peyton
(74) *Attorney, Agent, or Firm* — Hanley, Flight & Zimmerman, LLC

(57) ABSTRACT

Methods, apparatus, systems, and articles of manufacture are disclosed to manage processor interrupts. An example apparatus includes at least one memory; instructions; and processor circuitry. The processor circuitry is to execute the instructions to receive an interrupt for a direct memory access to transfer a packet. The processor circuitry is to execute the instructions to decode a priority field in the packet to associate the interrupt with a traffic class. The processor circuitry is to execute the instructions to route the interrupt to an interrupt timer based on the traffic class, the interrupt timer to mask interrupts transmitted to the interrupt timer for a threshold period after receiving the interrupt. The processor circuitry is to execute the instructions to send the interrupt after the threshold period.

22 Claims, 14 Drawing Sheets

(56) References Cited

U.S. PATENT DOCUMENTS

| | | | | |
|---|---|---|---|---|
| 11,824,788 | B2 * | 11/2023 | Ko | H04L 45/3065 |
| 11,886,308 | B2 * | 1/2024 | Vaideeswaran | G06F 11/2005 |
| 11,956,156 | B2 * | 4/2024 | Thyagaturu | H04L 43/028 |
| 2016/0379109 | A1 * | 12/2016 | Chung | G06F 15/7803<br>706/26 |
| 2019/0121781 | A1 * | 4/2019 | Kasichainula | G06F 15/17331 |
| 2022/0311710 | A1 | 9/2022 | Kasichainula | |

* cited by examiner

800

| TRAFFIC CLASS (802) | PRIORITY FIELD (804) | TRAFFIC TYPE (806) | COLOR CODING (808) |
|---|---|---|---|
| TC7 810 | PCP6 812 | ISOCHRONUS 814 | RED 816 |
| TC6 | PCP5 | CYCLIC | ORANGE |
| TC5 | PCP4 | PROFILE A | GREEN |
| TC4 | PCP7 | NETWORK | GRAY |
| TC3 | PCP3 | EVENTS | YELLOW |
| TC2 | PCP2 | CONFIGURATION | BLUE |
| TC1 818 | PCP1 820 | BEST EFFORT HIGH 822 | LIGHT GRAY 824 |
| TC0 | PCP0 | BEST EFFORT LOW | LIGHT GRAY |

FIG. 8

METHOD FOR NETWORK INTERFACE CARD (NIC) HAVING INSTRUCTION FOR DELAYING DELIVERY OF AN INTERRUPT TO CPU BASED ON TYPE OF TRAFFIC CLASS OF RECEIVED PACKET

FIELD OF THE DISCLOSURE

This disclosure relates generally to networking and, more particularly, to methods and apparatus to manage processor interrupts.

BACKGROUND

Edge network environments enable services near endpoint devices that interact with the services. Edge network environments may include infrastructure, such as a base station or micro-datacenter hosting an Edge service, that is connected to cloud infrastructure, endpoint devices, or additional Edge infrastructure via networks such as a wide area network (WAN), a metropolitan area network (MAN), or (more generally) the internet. Edge services are generally closer in network proximity to endpoint devices than cloud infrastructure, such as datacenter servers.

BRIEF DESCRIPTION OF THE DRAWINGS

FIG. 8 is a table illustrating example traffic class priorities and associated data.

Figure 1:
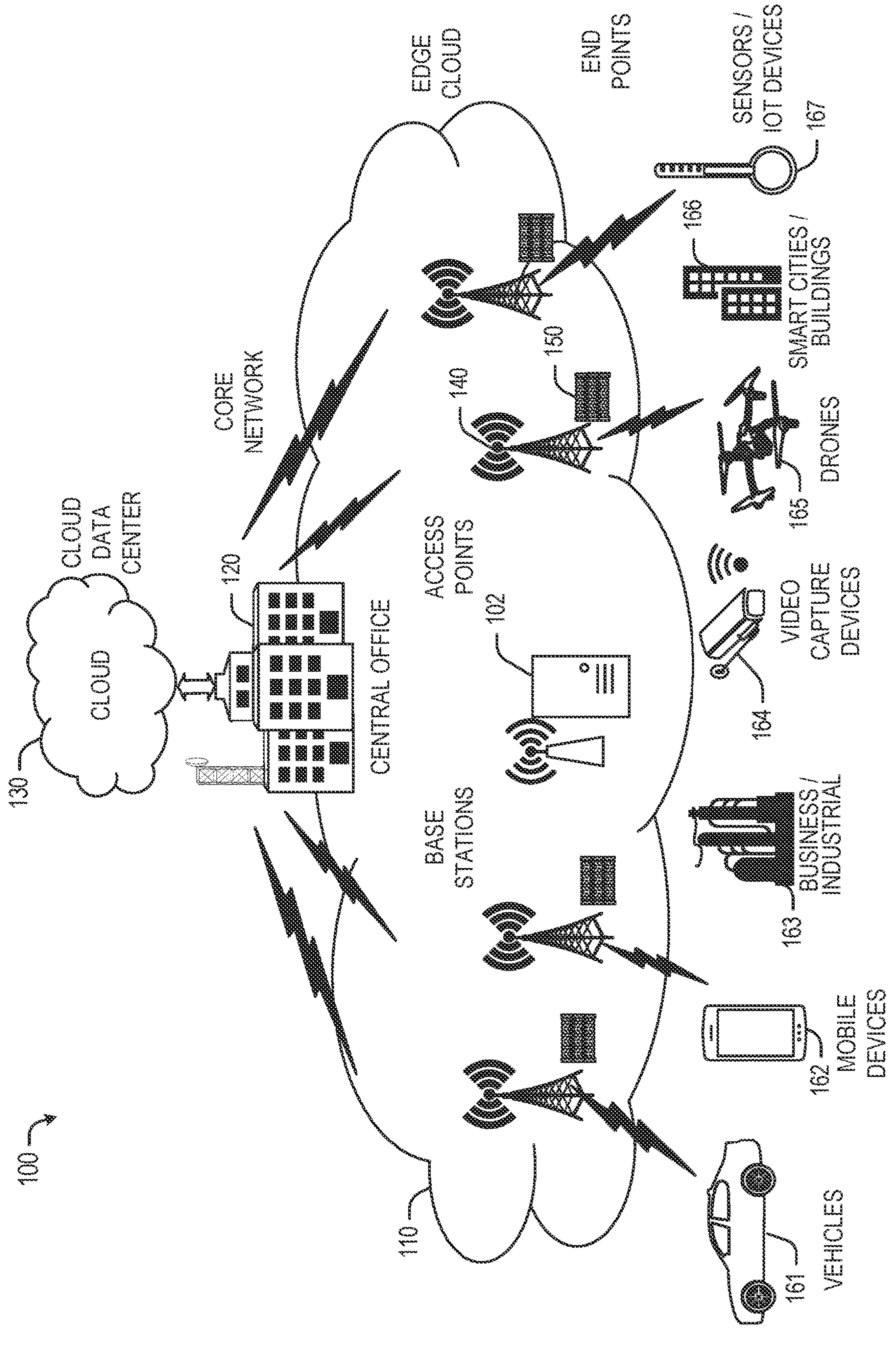
FIG. 1 illustrates an overview of an example Edge cloud configuration for Edge computing.

In general, the same reference numbers will be used throughout the drawing(s) and accompanying written description to refer to the same or like parts. The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

Notwithstanding the foregoing, in the case of a semiconductor device, "above" is not with reference to Earth, but instead is with reference to a bulk region of a base semiconductor substrate (e.g., a semiconductor wafer) on which components of an integrated circuit are formed. Specifically, as used herein, a first component of an integrated circuit is "above" a second component when the first component is farther away from the bulk region of the semiconductor substrate than the second component.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description. As used herein "substantially real time" refers to occurrence in a near instantaneous manner recognizing there may be real world delays for computing time, transmission, etc. Thus, unless otherwise specified, "substantially real time" refers to real time+/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

DETAILED DESCRIPTION

Edge computing is a distributed computing scheme that brings computation and data storage close to the physical location at which it is needed. Reducing distance between data computation devices and data generating devices reduces data transport latency, as data is not sent across long distances. In Edge computing, data is stored and processed near end-point devices, improving response time, saving bandwidth, and improving reliability. Additionally, Edge computing systems may still communicate with cloud devices (e.g., datacenters) when workloads exceed local compute and/or storage capabilities.

Edge computing reduces latency, which is especially beneficial for time-sensitive applications. Industries such as robotics, manufacturing, healthcare, and autonomous driving rely on real-time performance guarantees to generate predictable results. To support low-latency Edge operations, the Institute of Electrical and Electronics Engineers (IEEE) has established a variety of standards for deterministic networking. Collectively, the standards are called time sensitive networking (TSN).

Embedded designers in the industrial and automotive spaces are increasingly integrating TSN hardware into their designs. Developed by the IEEE 802 working group, TSN enables low-latency communication over Ethernet and supports applications that rely on tight synchronization windows. TSN helps satisfy modern embedded hardware demands such as seamless communication across connected devices, transfer of heterogenous data traffic, and other real-time requirements.

Modern applications increasingly include webs of interactive microservices with different traffic types. In such microservices, each traffic type may be associated with a different priority. To manage the various traffic priorities, the IEEE 802.1Q standard defines eight traffic classes. To support the eight traffic classes, many NICs include eight transmit (Tx) queues and eight receive (Rx) queues, with one Tx/Rx queue pair dedicated to each traffic class. Some NICs may map a single hardware packet queue to a single direct memory access (DMA) channel.

In many industrial applications, several hundred data streams may flow through a single NIC. Each data stream may be handled by a single DMA channel, which generates interrupts to facilitate the data transfer between a NIC and a host memory. As network speeds have increased, an increasing strain has been placed on NICs. A ten-gigabit per second communication with a minimum packet size of 64 bytes may generate thirty million interrupts per second. Such a high number of interrupts may be described as an interrupt storm, which monopolizes central processing unit (CPU) utilization. High-priority network traffic may call for high processor utilization, but lower priority traffic may needlessly use important CPU cycles.

Some NICs may handle multiple interrupts using one or more timers (e.g., watchdog timers). Each interrupt source may be provided its own timer, but such timers traditionally do not distinguish between packet data types. Furthermore, as the number of interrupts increases, a correspondingly large chip area must be reserved for the timers.

Other NICs rely on methods such as interrupt on completion (IOC), in which each packet includes an interrupt bit that may be set to trigger an interrupt. However, IOC techniques rely on software moderation that generates additional processing overhead.

Examples disclosed herein dynamically batch and moderate network traffic based on data type, preserving data streams and avoiding interrupt storms caused by low-priority data. Some examples dynamically detect a data stream type based on a priority code point (PCP) field, associating watchdog timers with the respective PCP field.

As the IEEE 802.1Q standard defines eight traffic classes, some examples include eight watchdog timers: one watchdog timer for each traffic class. Each of the eight watchdog timers can be associated with a different delay. Thus, high priority data stream interrupts can be routed to timers programmed with a minimal delay value. Low priority data stream interrupts can be provided to are throttled according to their traffic class assignment.

Turning to the figures, FIG. 1 is a block diagram 100 showing an overview of a configuration for Edge computing, which includes a layer of processing referred to in many of the following examples as an "Edge cloud". As shown, the Edge cloud 110 is co-located at an Edge location, such as an access point or base station 140, a local processing hub 150, or a central office 120, and thus may include multiple entities, devices, and equipment instances. The example edge cloud 110 also includes example interrupt batching and moderation circuitry 102. The structure and operation of the example interrupt batching and moderation circuitry 102 will be described further in connection with FIGS. 4-7. The Edge cloud 110 is located much closer to the endpoint (consumer and producer) data sources 161-167 (e.g., autonomous vehicles 161, user equipment 162, business and industrial equipment 163, video capture devices 164, drones 165, smart cities and building devices 166, sensors and IoT devices 167, etc.) than the cloud data center 130. Compute, memory, and storage resources which are offered at the edges in the Edge cloud 110 are critical to providing ultra-low latency response times for services and functions used by the endpoint data sources 160 as well as reduce network backhaul traffic from the Edge cloud 110 toward cloud data center 130 thus improving energy consumption and overall network usages among other benefits.

Compute, memory, and storage are scarce resources, and generally decrease depending on the Edge location (e.g., fewer processing resources being available at consumer endpoint devices, than at a base station, than at a central office). However, the closer that the Edge location is to the endpoint (e.g., user equipment (UE)), the more that space and power is often constrained. Thus, Edge computing attempts to reduce the amount of resources needed for network services, through the distribution of more resources which are located closer both geographically and in network access time. In this manner, Edge computing attempts to bring the compute resources to the workload data where appropriate, or bring the workload data to the compute resources.

The following describes aspects of an Edge cloud architecture that covers multiple potential deployments and addresses restrictions that some network operators or service providers may have in their own infrastructures. These include, variation of configurations based on the Edge location (because edges at a base station level, for instance, may have more constrained performance and capabilities in a multi-tenant scenario); configurations based on the type of compute, memory, storage, fabric, acceleration, or like resources available to Edge locations, tiers of locations, or groups of locations; the service, security, and management and orchestration capabilities; and related objectives to achieve usability and performance of end services. These deployments may accomplish processing in network layers that may be considered as "near Edge", "close Edge", "local Edge", "middle Edge", or "far Edge" layers, depending on latency, distance, and timing characteristics.

Edge computing is a developing paradigm where computing is performed at or closer to the "Edge" of a network, typically through the use of a compute platform (e.g., x86 or ARM compute hardware architecture) implemented at base stations, gateways, network routers, or other devices which are much closer to endpoint devices producing and consuming the data. For example, Edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within Edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 2:
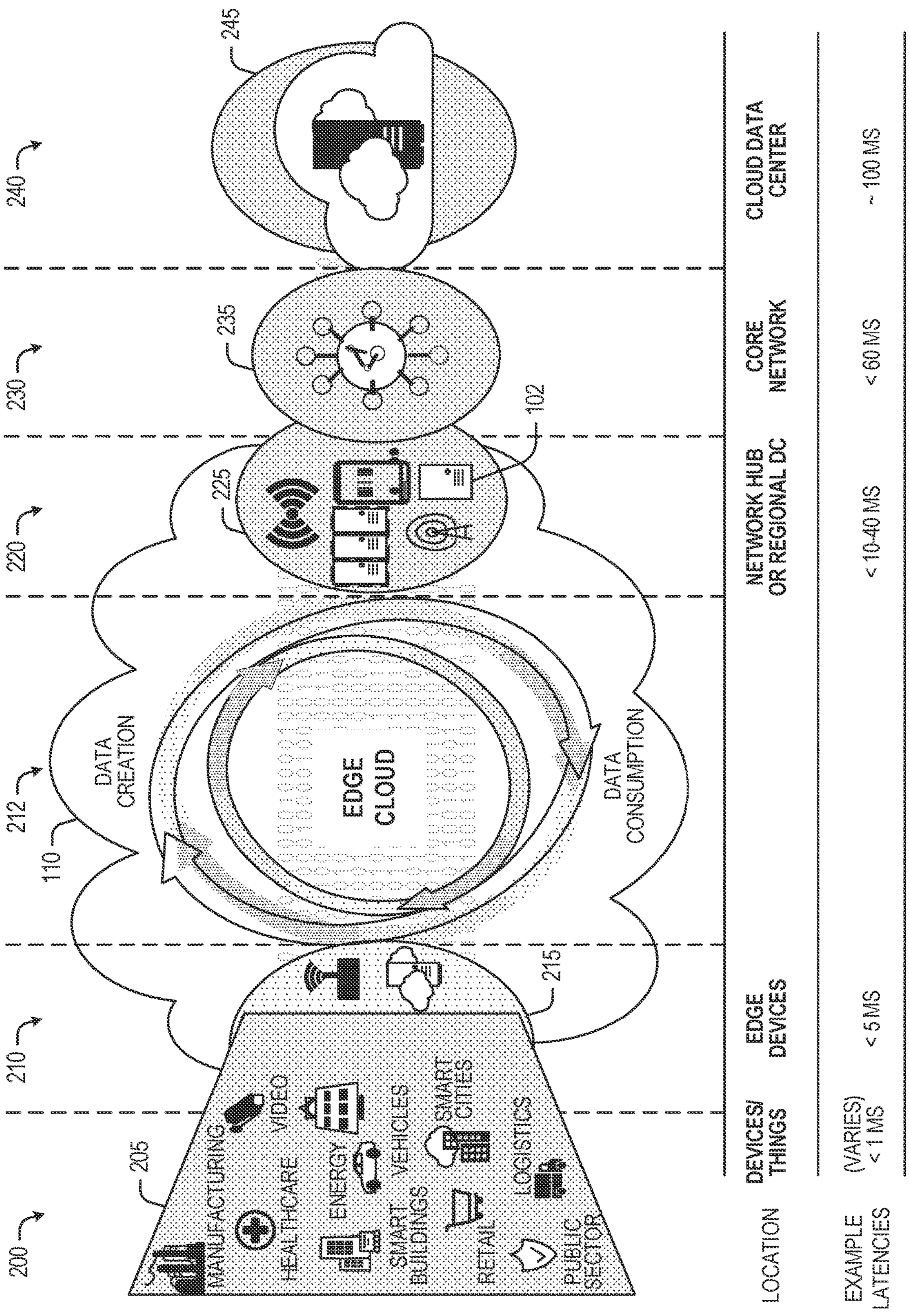
FIG. 2 illustrates operational layers among endpoints, an example Edge cloud, and cloud computing environments.

FIG. 2 illustrates operational layers among endpoints, an Edge cloud, and cloud computing environments. Specifically, FIG. 2 depicts examples of computational use cases 205, utilizing the Edge cloud 110 among multiple illustrative layers of network computing. The layers begin at an endpoint (devices and things) layer 200, which accesses the Edge cloud 110 to conduct data creation, analysis, and data consumption activities. The Edge cloud 110 may span multiple network layers, such as an Edge devices layer 210 having gateways, on-premise servers, or network equipment (nodes 215) located in physically proximate Edge systems; a network access layer 220, encompassing base stations, radio processing units, network hubs, regional data centers (DC), or local network equipment (equipment 225 including the example interrupt batching and moderation circuitry 102); and any equipment, devices, or nodes located therebetween (in layer 212, not illustrated in detail). The network communications within the Edge cloud 110 and among the various layers may occur via any number of wired or wireless mediums, including via connectivity architectures and technologies not depicted. For example, the interrupt batching and moderation circuitry may operate in the example Edge devices layer 210 or in any part of layer 212.

Examples of latency, resulting from network communication distance and processing time constraints, may range from less than a millisecond (ms) when among the endpoint layer 200, under 5 ms at the Edge devices layer 210, to even between 10 to 40 ms when communicating with nodes at the network access layer 220. Beyond the Edge cloud 110 are core network 230 and cloud data center 240 layers, each with increasing latency (e.g., between 50-60 ms at the core network layer 230, to 100 or more ms at the cloud data center layer). As a result, operations at a core network data center 235 or a cloud data center 245, with latencies of at least 50 to 100 ms or more, will not be able to accomplish many time-critical functions of the use cases 205. Each of these latency values are provided for purposes of illustration and contrast; it will be understood that the use of other access network mediums and technologies may further reduce the latencies. In some examples, respective portions of the network may be categorized as "close Edge", "local Edge", "near Edge", "middle Edge", or "far Edge" layers, relative to a network source and destination. For instance, from the perspective of the core network data center 235 or a cloud data center 245, a central office or content data network may be considered as being located within a "near Edge" layer ("near" to the cloud, having high latency values when communicating with the devices and endpoints of the use cases 205), whereas an access point, base station, on-premise server, or network gateway may be considered as located within a "far Edge" layer ("far" from the cloud, having low latency values when communicating with the devices and endpoints of the use cases 205). It will be understood that other categorizations of a particular network layer as constituting a "close", "local", "near", "middle", or "far" Edge may be based on latency, distance, number of network hops, or other measurable characteristics, as measured from a source in any of the network layers 200-240.

The various use cases 205 may access resources under usage pressure from incoming streams, due to multiple services utilizing the Edge cloud. To achieve results with low latency, the services executed within the Edge cloud 110 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor, etc.).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to Service Level Agreement (SLA), the system as a whole (components in the transaction) may provide the ability to (1) understand the impact of the SLA violation, and (2) augment other components in the system to resume overall transaction SLA, and (3) implement remediation.

Thus, with these variations and service features in mind, Edge computing within the Edge cloud 110 may provide the ability to serve and respond to multiple applications of the use cases 205 (e.g., object tracking, video surveillance, connected cars, etc.) in real-time or near real-time, and meet ultra-low latency requirements for these multiple applications. These advantages enable a whole new class of applications (e.g., Virtual Network Functions (VNFs), Function as a Service (FaaS), Edge as a Service (EaaS), standard processes, etc.), which cannot leverage conventional cloud computing due to latency or other limitations.

However, with the advantages of Edge computing comes the following caveats. The devices located at the Edge are often resource constrained and therefore there is pressure on usage of Edge resources. Typically, this is addressed through pooling of memory and storage resources for use by multiple users (tenants) and devices. The Edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because Edge locations may be unmanned and may even need permissioned access (e.g., when housed in a third-party location). Such issues are magnified in the Edge cloud 110 in a multi-tenant, multi-owner, or multi-access setting, where services and applications are requested by many users, especially as network usage dynamically fluctuates and the composition of the multiple stakeholders, use cases, and services changes.

At a more generic level, an Edge computing system may be described to encompass any number of deployments at the previously discussed layers operating in the Edge cloud 110 (network layers 200-240), which provide coordination from client and distributed computing devices. One or more Edge gateway nodes, one or more Edge aggregation nodes, and one or more core data centers may be distributed across layers of the network to provide an implementation of the Edge computing system by or on behalf of a telecommunication service provider ("telco", "CommSP", or "TSP"), internet-of-things service provider, cloud service provider (CSP), enterprise entity, or any other number of entities. Various implementations and configurations of the Edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the Edge computing system does not necessarily mean that such node or device operates in a client or agent/minion/follower role; rather, any of the nodes or devices in the Edge computing system refer to individual entities, nodes, or subsystems which include discrete or connected hardware or software configurations to facilitate or use the Edge cloud 110.

As such, the Edge cloud 110 is formed from network components and functional features operated by and within Edge gateway nodes, Edge aggregation nodes, or other Edge compute nodes among network layers 210-230. The Edge cloud 110 thus may be embodied as any type of network that provides Edge computing and/or storage resources which are proximately located to radio access network (RAN) capable endpoint devices (e.g., mobile computing devices, IoT devices, smart devices, etc.), which are discussed herein. In other words, the Edge cloud 110 may be envisioned as an "Edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks, etc.) may also be utilized in place of or in combination with such 3GPP carrier networks.

The network components of the Edge cloud 110 may be servers, multi-tenant servers, appliance computing devices, and/or any other type of computing devices. For example, the Edge cloud 110 may include an appliance computing device that is a self-contained electronic device including a housing, a chassis, a case, or a shell. In some circumstances, the housing may be dimensioned for portability such that it can be carried by a human and/or shipped. Example housings may include materials that form one or more exterior surfaces that partially or fully protect contents of the appliance, in which protection may include weather protection, hazardous environment protection (e.g., electromagnetic interference (EMI), vibration, extreme temperatures, etc.), and/or enable submergibility. Example housings may include power circuitry to provide power for stationary and/or portable implementations, such as alternating current (AC) power inputs, direct current (DC) power inputs, AC/DC converter(s), DC/AC converter(s), DC/DC converter(s), power regulators, transformers, charging circuitry, batteries, wired inputs, and/or wireless power inputs. Example housings and/or surfaces thereof may include or connect to mounting hardware to enable attachment to structures such as buildings, telecommunication structures (e.g., poles, antenna structures, etc.), and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, infrared or other visual thermal sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, rotors such as propellers, etc.) and/or articulating hardware (e.g., robot arms, pivotable appendages, etc.). In some circumstances, the sensors may include any type of input devices such as user interface hardware (e.g., buttons, switches, dials, sliders, microphones, etc.). In some circumstances, example housings include output devices contained in, carried by, embedded therein and/or attached thereto. Output devices may include displays, touchscreens, lights, light-emitting diodes (LEDs), speakers, input/output (I/O) ports (e.g., universal serial bus (USB)), etc. In some circumstances, Edge devices are devices presented in the network for a specific purpose (e.g., a traffic light), but may have processing and/or other capacities that may be utilized for other purposes. Such Edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIGS. 11-13. The Edge cloud 110 may also include one or more servers and/or one or more multi-tenant servers. Such a server may include an operating system and implement a virtual computing environment. A virtual computing environment may include a hypervisor managing (e.g., spawning, deploying, commissioning, destroying, decommissioning, etc.) one or more virtual machines, one or more containers, etc. Such virtual computing environments provide an execution environment in which one or more applications and/or other software, code, or scripts may execute while being isolated from one or more other applications, software, code, or scripts.

Figure 3:
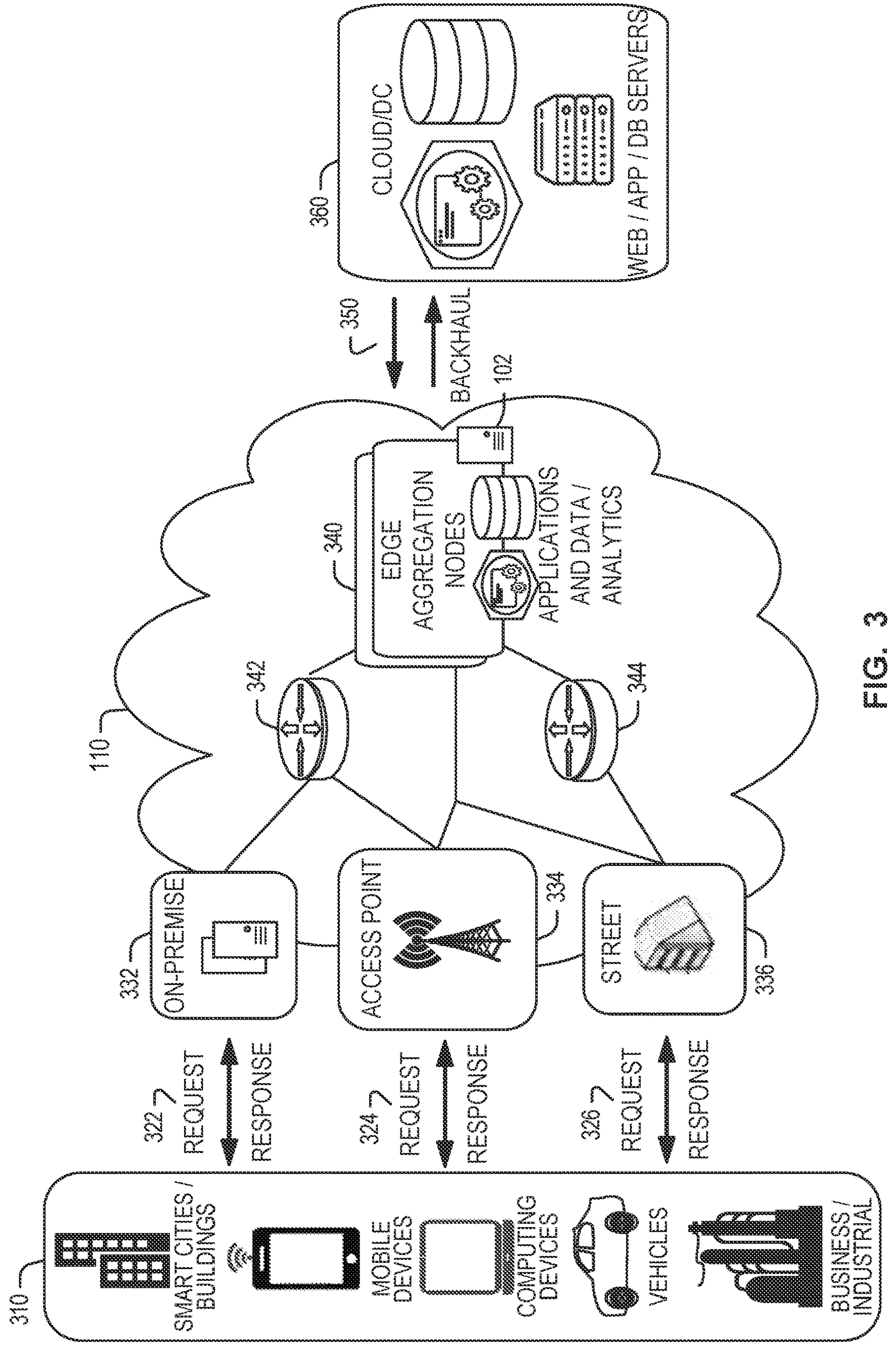
FIG. 3 illustrates an example approach for networking and services in an Edge computing system.

In FIG. 3, various client endpoints 310 (in the form of mobile devices, computers, autonomous vehicles, business computing equipment, industrial processing equipment) exchange requests and responses that are specific to the type of endpoint network aggregation. For instance, client endpoints 310 may obtain network access via a wired broadband network, by exchanging requests and responses 322 through an on-premise network system 332. Some client endpoints 310, such as mobile computing devices, may obtain network access via a wireless broadband network, by exchanging requests and responses 324 through an access point (e.g., a cellular network tower) 334. Some client endpoints 310, such as autonomous vehicles may obtain network access for requests and responses 326 via a wireless vehicular network through a street-located network system 336. However, regardless of the type of network access, the TSP may deploy aggregation points 342, 344 within the Edge cloud 110 to aggregate traffic and requests. Thus, within the Edge cloud 110, the TSP may deploy various compute and storage resources, such as at Edge aggregation nodes 340, to provide requested content. The Edge aggregation nodes 340 and other systems of the Edge cloud 110 are connected to a cloud or data center 360, which uses a backhaul network 350 to fulfill higher-latency requests from a cloud/data center for websites, applications, database servers, etc. Additional or consolidated instances of the Edge aggregation nodes 340, the example interrupt batching and moderation circuitry 102, and the aggregation points 342, 344, including those deployed on a single server framework, may also be present within the Edge cloud 110 or other areas of the TSP infrastructure.

Figure 4:
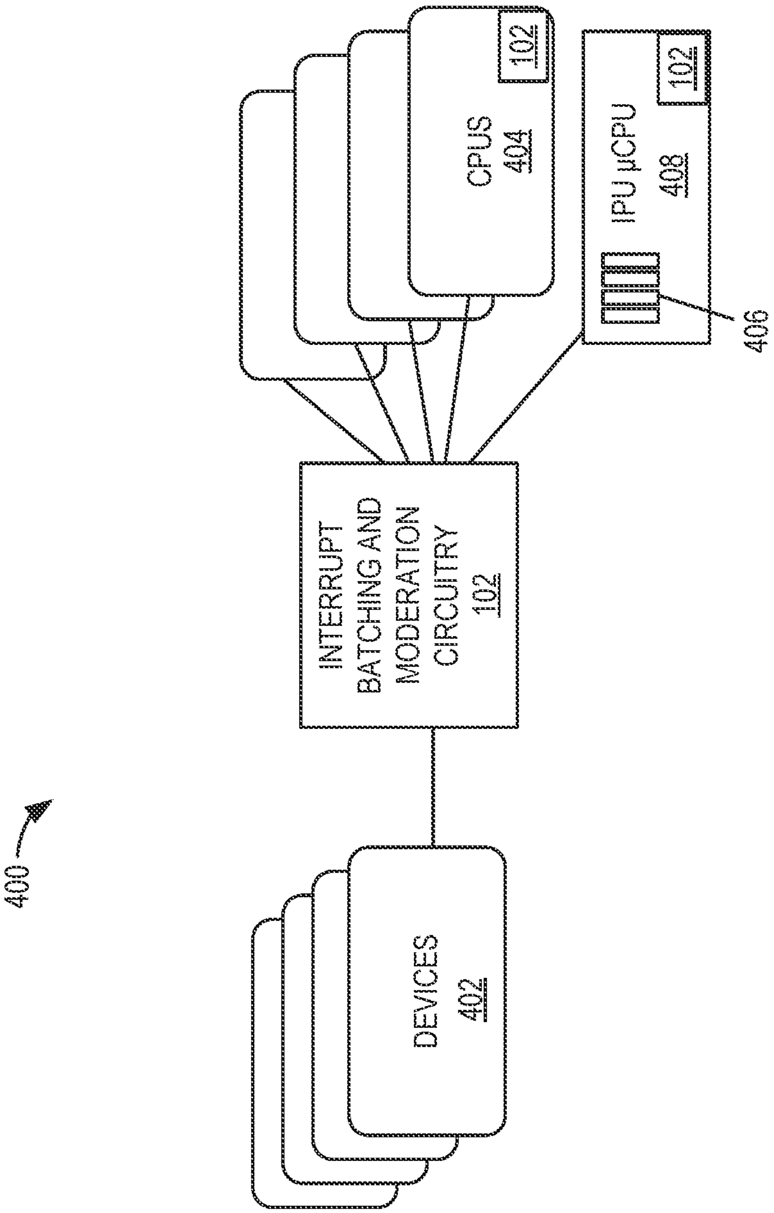
FIG. 4 is a block diagram of an example system of interrupt handlers including interrupt batching and moderation circuitry.

FIG. 4 is a block diagram of an example system 400 of interrupt handlers including example interrupt batching and moderation circuitry 102. The example system 400 includes devices 402, the example interrupt batching and moderation circuitry 102, example CPUs 404, an example interrupt queue 406, and an example micro central processing unit (uCPU) 408. In some examples, the uCPU 408 may be an infrastructure processing unit (IPU) that accelerates workloads with significant network communication overhead. In some examples, the uCPU 408 may be a uCPU that is part of an IPU. The example of FIG. 4 illustrates how the interrupt batching and moderation circuitry 102 may be located at multiple points of the example system 400 to perform interrupt handling (e.g., at first and second levels, device and processor level, etc.). Although the example system 400 includes interrupt handling at both the device and processor level, in some examples only one instance of the example interrupt batching and moderation circuitry 102 is present in a system and therefore interrupt batching and moderation may occur at only one level of the system 400.

The example devices 402 are network interface devices that generate interrupts. For example, the devices 402 may include a network interface device that generates interrupts when a network packet is transmitted or received. The devices 402 are not limited to network interface devices, however, and may include storage devices, keyboards, mice, scanners, printers, or any other device that generates an interrupt. In the example system 400, the devices 402 transmit interrupts to the example batching and moderation circuitry 102.

The example interrupt batching and moderation circuitry 102 can operate at the device level in which interrupts are routed to one or more CPUs. At the device level, interrupts are directed to one or more CPUs 404 and/or an example uCPU 408 through the interrupt batching and moderation circuitry 102 based on the sleep mode status of the CPUs.

If an interrupt is typically routed to a first CPU executing in a non-sleep mode (e.g., normal mode), the interrupt may be transmitted directly to the first CPU. However, when the first CPU is in a power saving (e.g., a sleep) mode, the interrupt batching and moderation circuitry 102 may direct the interrupt to another processing device (e.g., a proxy device). In some examples, the CPU proxy is mapped to the uCPU that is implemented in an infrastructure processing unit (IPU) 408.

In the system 400, the interrupt batching and moderation circuitry 102 of the uCPU 408 is a first-level interrupt handler that manages an interrupt queue (e.g., the interrupt queue 406) of interrupts to be handled by a second-level interrupt handler. The second-level interrupt handler may run either on the uCPU 408 or on one of the CPUs 404. Thus, at the device level, the interrupt batching and moderation circuitry 102 allows the devices 402 to continue low-latency operation even if one of the CPUs 404 is in a sleep mode.

The example interrupt batching and moderation circuitry 102 may route interrupts to specific CPUs based on C-states. C-states are states when a CPU reduces its functionality.

Different processors support different numbers of C-states with varying levels of processor activity. In some industrial applications, CPU C-state transitions are disabled. However, in smart infrastructure applications, turning off C-state transitions is often unacceptable as such infrastructure often demands precise power management.

In some examples, the interrupt batching and moderation circuitry 102 improves CPU C-state efficiency by allowing a uCPU 408 (e.g., a smart-NIC) to absorb a first series interrupts (e.g., a micro-batch of interrupts) on behalf of all CPUs. Then, the uCPU 408 can redirect micro-batches of interrupts to a second level CPU if activity further increases, bringing additional CPUs 404 out of a sleep state. The first level CPU may be low power with limited cache that is only active when second level CPUs are in a sleep state.

Thus, under light workloads, interrupts may be handled by the uCPU 408. In some examples, the interrupt batching and moderation circuitry 102 can micro-batch a number of interrupts and periodically hand them off to the uCPU 408. Then, as activity ramps up and one or more of the CPUs 404 exit a C-State, the interrupt batching and moderation circuitry 102 can transmit an instruction to shut down the uCPU 408 and flush the uCPU 408 cache.

In some examples, the uCPU 408 may instead be a low power thread on one of the CPUs 404 that runs in a low power mode. For example, the uCPU 408 may shutdown or dramatically reduce execution to conserve power until it is has been brought out of the low power mode. In some examples, the uCPU 408, the CPUs 404, and/or the example interrupt batching and moderation circuitry 102 may be turned on/off via a remote access application programming interface (API). In some examples, the uCPU 408, the CPUs 404, and/or the example interrupt batching and moderation circuitry 102 may move between one or more sleep states based on a call to an associated API endpoint.

Figure 5:
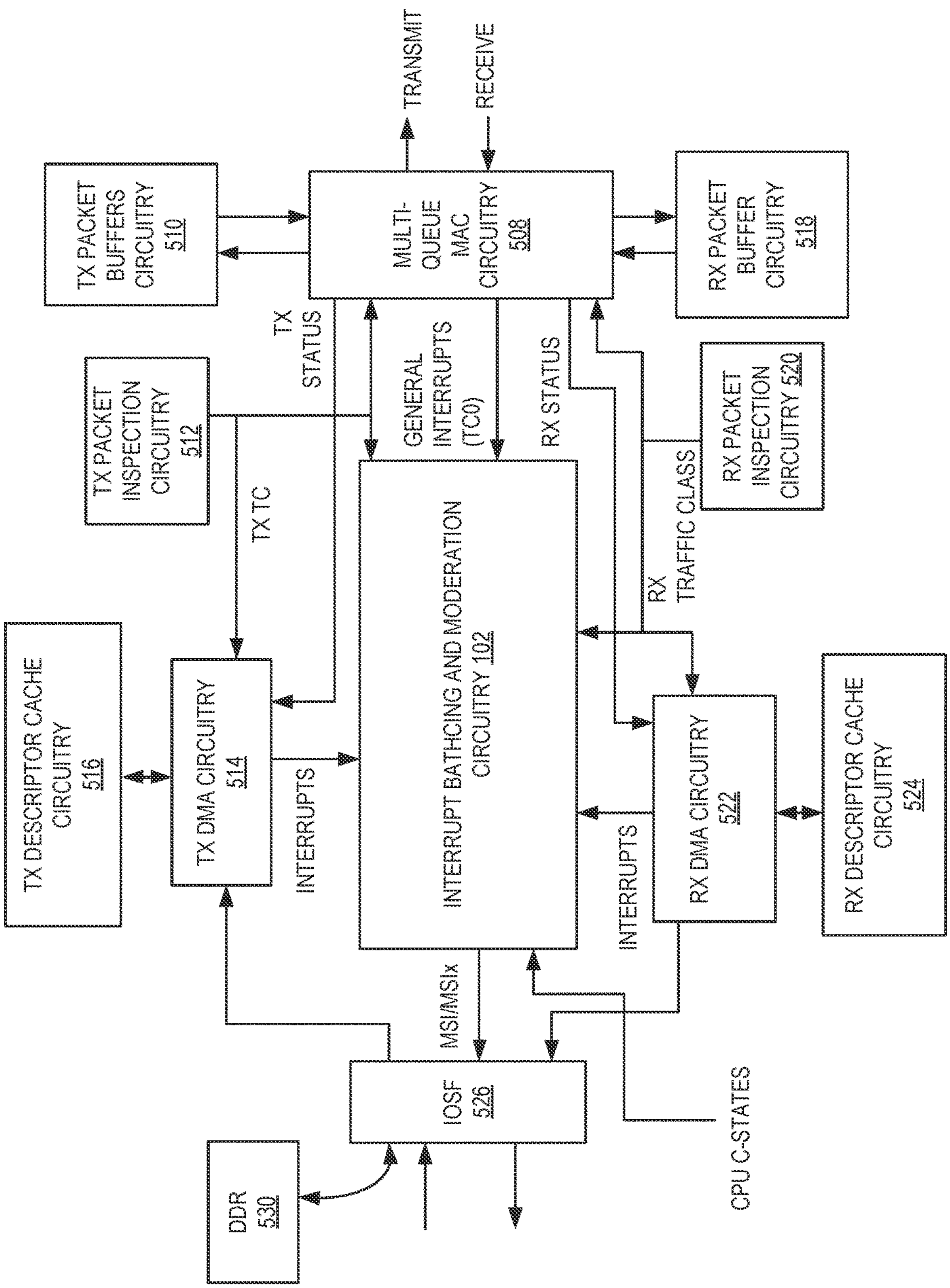
FIG. 5 is a block diagram of an example network interface card that includes interrupt batching and moderation circuitry.

FIG. 5 is a block diagram of an example network interface card that includes the example interrupt batching and moderation circuitry 102. Example multi-queue media access control (MAC) circuitry 508 receives interrupts to/from a direct memory access (DMA) engine during data transfer. A DMA engine allows input/output (I/O) devices to write directly to main memory and includes registers in which memory addresses, number of bytes, direction of transfer, units of transfer, etc. may be written by a CPU.

The DMA engine generates an interrupt as a packet crosses a media-independent interface (MII) (e.g., a gigabit media-independent interface (GMII), a ten-gigabit media-independent interface (XGMII), etc.). The GMII is an interface between the physical layer and the multi-queue MAC circuitry 508. Thus, a receive interrupt is generated when the DMA engine writes the received packet into the main memory.

The multi-queue MAC circuitry 508 may include a first queue for receiving interrupts and a second queue for transmitting interrupts. The example multi-queue MAC circuitry 508 may provide a packet to RX packet buffer circuitry 518 that stores the packet until it is ready for processing. In some examples, the RX packet buffer circuitry 518 may include 8 queues, one queue for each interrupt class. The example multi-queue MAC circuitry 508 may also transmit a RX status to the example RX DMA circuitry 522.

The example interrupt batching and moderation circuitry 102 batches RX interrupts that belong to the same traffic class. As described above, the IEEE 802.1Q standard defines eight traffic classes (TC0 to TC7). To facilitate batching interrupts, example RX packet inspection circuitry 520 identifies a traffic class for packets and provides the class information to the example interrupt batching and moderation circuitry 102. The interrupt batching and moderation circuitry 102 may then transmit a message signaled interrupt (MSI) to a CPU.

In some examples, to decode a traffic class of a received packet, the example RX packet inspection circuitry 520 may decode a PCP priority field of a received packet. The RX DMA circuitry 522 may transmit RX descriptor information that describes the packet (e.g., where a packet is stored, a length of the packet, etc.) to example RX descriptor cache circuitry 524.

The example RX DMA circuitry 522 includes 128 channels and transmits information to an on-chip system fabric (IOSF) 526, which is an on-die interconnect protocol. The IOSF may transmit interrupt messages to a primary scalable fabric (PSF) that provides interconnection of IP blocks within an I/O subsystem. Additionally or alternatively, the example IOSF 526 may communicate directly with the double data rate (DDR) memory.

The example interrupt batching and moderation circuitry 102 also batches and moderates transmission interrupts. During transmission of a packet, the interrupt batching and moderation circuitry 102 receives interrupts from the TX DMA circuitry 514. The interrupt batching and moderation circuitry 102 also receives associated traffic class information from the example TX packet inspection circuitry 512. TX descriptor cache circuitry stores descriptive information about the packet to be transmitted. TX packet buffers circuitry 510 stores the packet data until ready for transmission by the multi-queue MAC circuitry 508.

Figure 6:
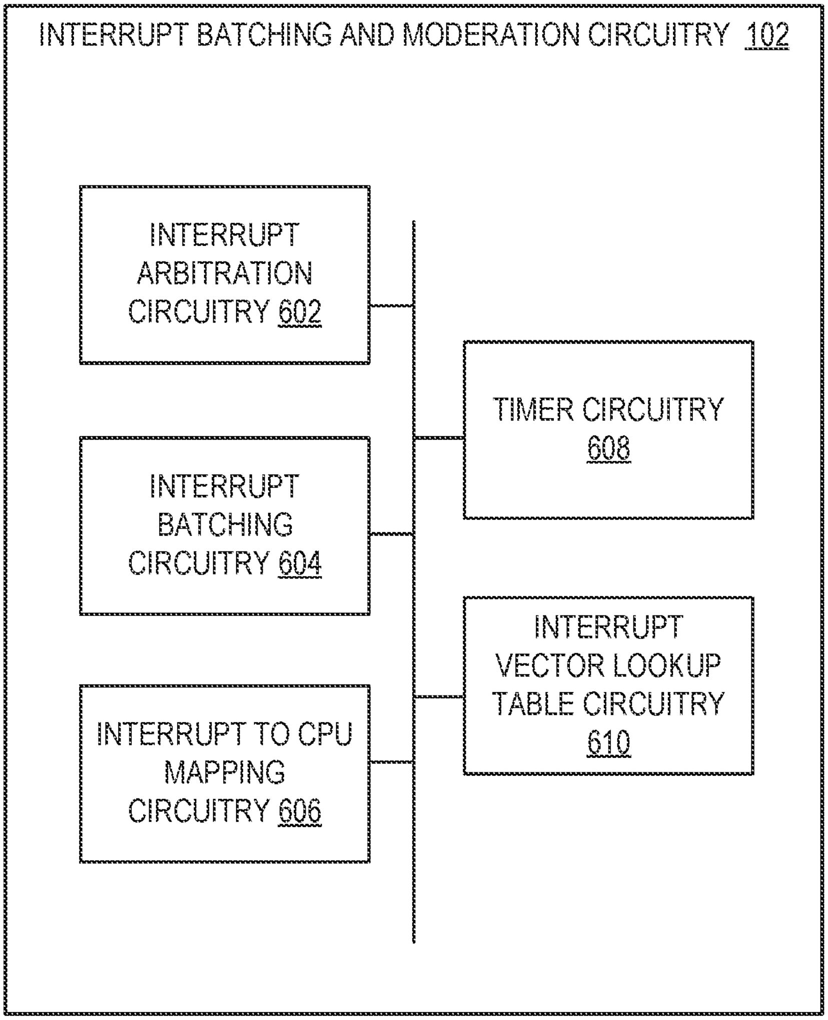
FIG. 6 is a block diagram of example interrupt batching and moderation circuitry.

FIG. 6 is a block diagram of the example interrupt batching and moderation circuitry 102 to batch and moderate interrupts. The example interrupt batching and moderation circuitry 102 of FIG. 6 may be instantiated (e.g., creating an instance of, bring into being for any length of time, materialize, implement, etc.) by processor circuitry such as a central processing unit executing instructions. Additionally or alternatively, the interrupt batching and moderation circuitry 102 of FIG. 6 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 6 may, thus, be instantiated at the same or different times. Some or all of the circuitry may be instantiated, for example, in one or more threads executing concurrently on hardware and/or in series on hardware. Moreover, in some examples, some or all of the circuitry of FIG. 6 may be implemented by microprocessor circuitry executing instructions to implement one or more virtual machines and/or containers.

The example interrupt batching and moderation circuitry 102 includes interrupt arbitration circuitry 602. The interrupt arbitration circuitry 602 is a strict priority interrupt arbiter. Therefore, interrupt signals from interrupts of eight interrupt timers (e.g., corresponding to the eight traffic classes of 802.1Q) are handled such that interrupts from a highest-priority timer is transmitted first. In other words, traffic from lower timers is processed only after the highest priority interrupts are transmitted.

The interrupt batching and moderation circuitry 102 includes eight interrupt timers, with each interrupt timer corresponding to one traffic class (e.g., TC0 to TC7). TC7 is a highest priority of the traffic classes. Thus, when an interrupt for TC7 and any of the other interrupt timers (e.g., TC0-TC6) have simultaneously pending interrupt signals, the TC7 interrupt is prioritized. Although the interrupt arbitration circuitry 602 performs interrupt arbitration in a strict priority manner, the interrupt arbitration circuitry 602 may perform interrupt arbitration using other arbitration methods. For example, the interrupt arbitration circuitry 602 may perform interrupt arbitration according to a weighted round robin method in which a number of interrupts transmitted is proportional to the priority of the timer.

In some examples, the interrupt arbitration circuitry 602 may be altered to manage a different number of traffic classes. For example, a future network transmission standard may include a 4-bit priority field. In such an example, the interrupt arbitration circuitry (and more generally the interrupt batching and moderation circuitry 102) may be scaled to include 16 timers, one for each potential traffic class corresponding to the four-bit priority field. More generally, the architecture of the example interrupt batching and moderation circuitry 102 is scalable to any number of traffic classes. Thus, although the interrupt batching and moderation circuitry 102 includes 8 traffic classes (e.g., per the IEEE 802.1Q standard), any number of traffic classes could be included in a scaled up (e.g., 16 timers, 128 timers, etc.) or a scaled down (e.g., 2 timers) instantiation of the interrupt batching and moderation circuitry 102.

Figure 9:
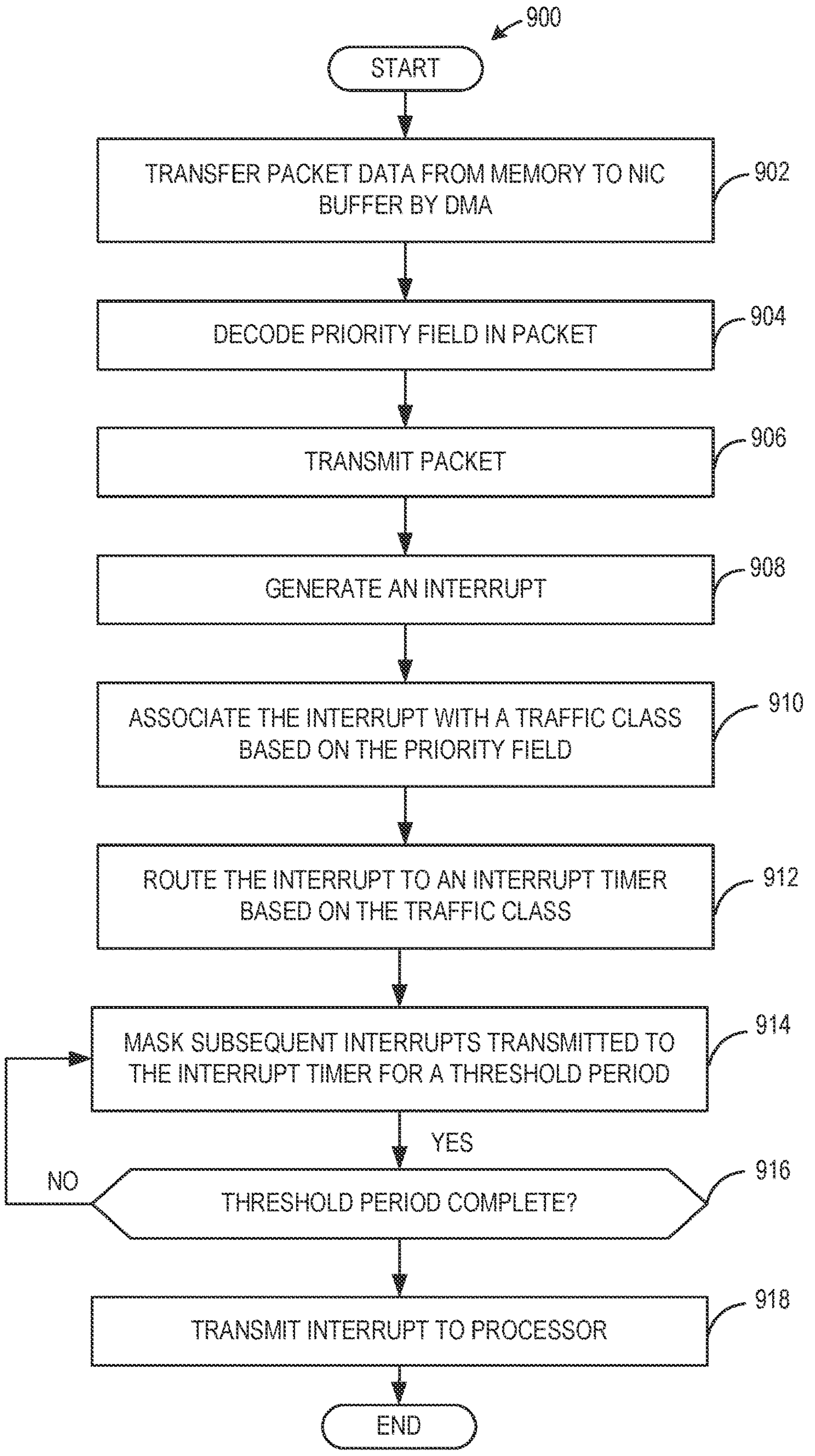
FIG. 9 is a flowchart representative of example machine readable instructions and/or example operations that may be executed by example processor circuitry to implement the interrupt batching and moderation circuitry of FIG. 2.
Figure 10:
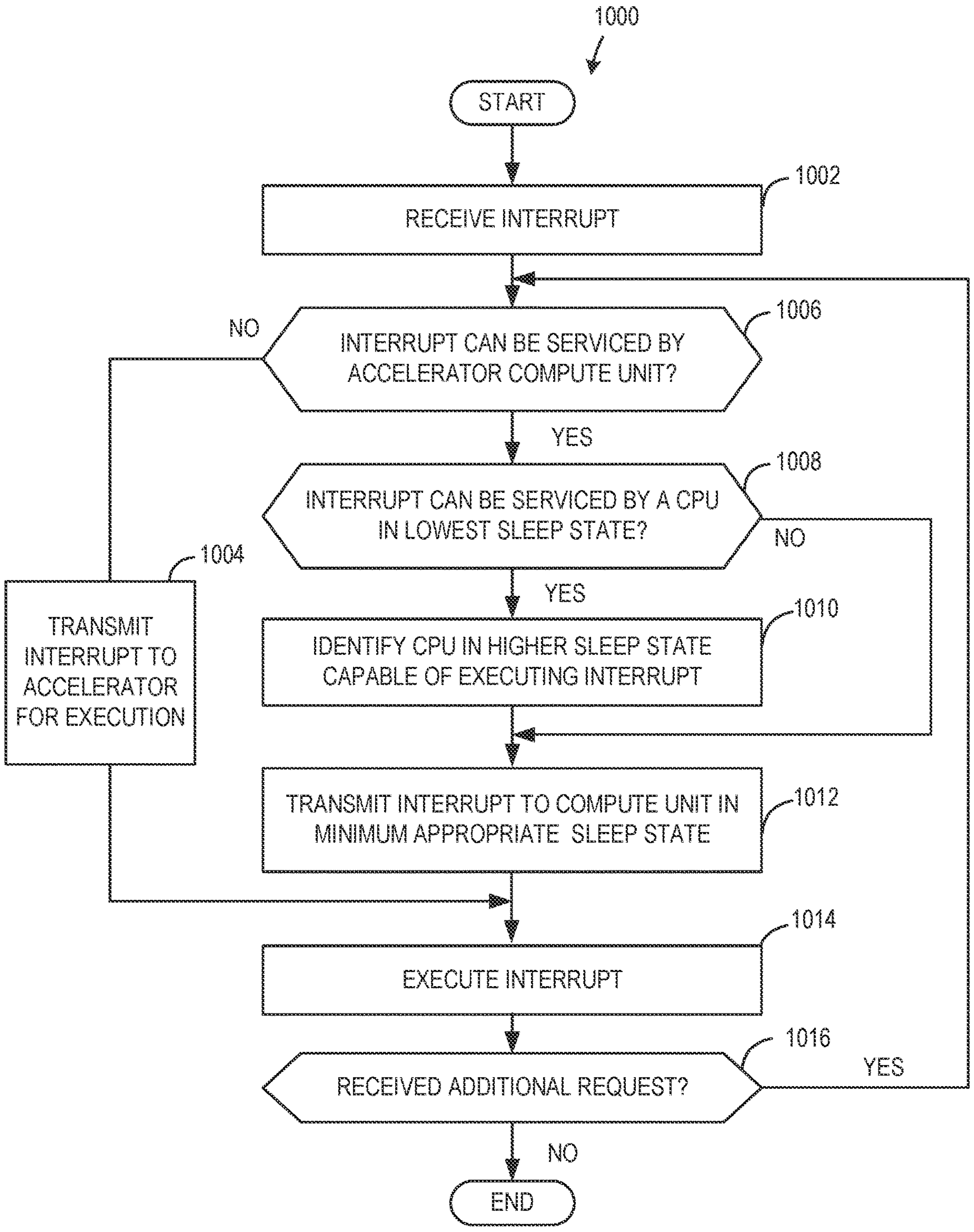
FIG. 10 is a flowchart representative of example machine readable instructions and/or example operations that may be executed by example processor circuitry to implement the interrupt batching and moderation circuitry of FIG. 4.

In some examples, the interrupt arbitration circuitry 602 is instantiated by processor circuitry executing interrupt arbitration instructions and/or configured to perform operations such as those represented by the flowcharts of FIGS. 9-10.

In some examples, the interrupt batching and moderation circuitry 102 includes means for arbitrating interrupts from watchdog timers. For example, the means for arbitrating interrupts may be implemented by the interrupt arbitration circuitry 602. In some examples, the interrupt arbitration circuitry 602 may be instantiated by processor circuitry such as the example processor circuitry 1112 of FIG. 11. For instance, the interrupt arbitration circuitry 602 may be instantiated by the example microprocessor 1200 of FIG. 12 executing machine executable instructions such as those implemented by at least blocks 910, 912 of FIG. 9. In some examples, the interrupt arbitration circuitry 602 may be instantiated by hardware logic circuitry, which may be implemented by an ASIC, XPU, or the FPGA circuitry 1300 of FIG. 13 structured to perform operations corresponding to the machine readable instructions. Additionally or alternatively, the interrupt arbitration circuitry 602 may be instantiated by any other combination of hardware, software, and/or firmware. For example, the interrupt arbitration circuitry 602 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example interrupt batching and moderation circuitry 102 includes example interrupt batching circuitry 604. The example interrupt batching circuitry 604 receives an interrupt and a traffic class field that is associated with the interrupt. The example interrupt batching circuitry 604 then routes the interrupt to a corresponding timer of example timer circuitry 608. For example, if an interrupt belongs to traffic class zero, the interrupt will be routed to the lowest timer (e.g., route it to the lowest priority timer).

If the interrupt batching circuitry 604 receives an interrupt with traffic class data corresponding to the highest priority, the interrupt batching circuitry 604 transmits the interrupt to the highest priority timer. Accordingly, the interrupt batching circuitry 604 includes routing logic to transmit the interrupt to a corresponding timer based on a traffic class and/or priority code of a packet.

In some examples, the interrupt batching circuitry 604 maintains a history of interrupt routing. The interrupt batching circuitry 604 can identify that a packet belongs to a particular grouping (e.g., a particular packet is low priority) and determine how recently a last batch in the grouping was serviced. Thus, if the interrupt batching circuitry 604 identifies an interrupt that is part of a low frequency interrupt flow, the interrupt may be ignored. Interrupts may also be ignored based on a time window. For example, if a packet is received outside a time window it may not be batched.

In some examples, the interrupt batching circuitry 604 is instantiated by processor circuitry executing interrupt batching instructions and/or configured to perform operations such as those represented by the flowcharts of FIGS. 9-10.

In some examples, the interrupt batching and moderation circuitry 102 includes means for batching interrupts based on a traffic class. For example, the means for batching interrupts may be implemented by the interrupt batching circuitry 604. In some examples, the interrupt batching circuitry 604 may be instantiated by processor circuitry such as the example processor circuitry 1112 of FIG. 11. For instance, the interrupt batching circuitry 604 may be instantiated by the example microprocessor 1200 of FIG. 12 executing machine executable instructions such as those implemented by at least blocks 904, 906, and 908 of FIG. 9, and blocks 1006, 1008, 1010, and 1012 of FIG. 10. In some examples, interrupt batching circuitry 604 may be instantiated by hardware logic circuitry, which may be implemented by an ASIC, XPU, or the FPGA circuitry 1300 of FIG. 13 structured to perform operations corresponding to the machine readable instructions. Additionally or alternatively, the interrupt batching circuitry 604 may be instantiated by any other combination of hardware, software, and/or firmware. For example, the interrupt batching circuitry 604 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example interrupt batching and moderation circuitry 102 includes interrupt to CPU mapping circuitry 606. The interrupt to CPU mapping circuitry 606 includes mapping registers that contain information regarding which queue interrupts are mapped to which CPU cores. The interrupt to CPU mapping circuitry facilitates mapping of interrupts to CPUs, uCPUs, and/or IPUs, redirecting the interrupts to a processing unit that can effectively handle the interrupt. For example, a interrupt to CPU mapping may indicate that an interrupt should be transmitted to a core that is in a deep sleep state. In such a scenario, a redirection and/or a balancing may be needed. The interrupt batching circuitry 604 and/or the example interrupt to CPU mapping circuitry 606 may transmit current CPU states and interrupt queue mapping information to the interrupt arbitration circuitry 602 and/or the interrupt batching circuitry 604.

Based on the CPU states and the interrupt to CPU mapping table, the interrupt batching circuitry 604 may reroute interrupts that are normally destined to a particular CPU to another processing unit at a first time. At a second time (e.g., after CPU cores are awakened) the interrupt batching circuitry 604 may redistribute the interrupts among the CPUs.

In some examples, the interrupt to CPU mapping circuitry 606 is instantiated by processor circuitry executing interrupt to CPU mapping instructions and/or configured to perform operations such as those represented by the flowcharts of FIGS. 9-10.

In some examples, the interrupt batching and moderation circuitry 102 includes means for mapping interrupt information to CPUs. For example, the means for mapping interrupt information to CPUs may be implemented by interrupt to CPU mapping circuitry 606. In some examples, the interrupt to CPU mapping circuitry 606 may be instantiated by processor circuitry such as the example processor circuitry 1112 of FIG. 11. For instance, interrupt to CPU mapping circuitry 606 may be instantiated by the example microprocessor 1200 of FIG. 12 executing machine executable instructions such as those implemented by at least blocks 1002, 1006, 1008, 1010 of FIG. 10. In some examples, interrupt to CPU mapping circuitry 606 may be instantiated by hardware logic circuitry, which may be implemented by an ASIC, XPU, or the FPGA circuitry 1300 of FIG. 13 structured to perform operations corresponding to the machine readable instructions. Additionally or alternatively, the interrupt to CPU mapping circuitry 606 may be instantiated by any other combination of hardware, software, and/or firmware. For example, the interrupt to CPU mapping circuitry 606 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example interrupt batching and moderation circuitry 102 includes example timer circuitry 608. The example timer circuitry 608 includes eight timers (e.g., watchdog timers). One or more of the timers may receive an interrupt for a traffic class. In response to receiving the interrupt, the timer may mask generation of further interrupts for a threshold period of time. The timer circuitry 608 may be internally programmed by the interrupt batching circuitry 604, for example.

The example timer circuitry 608 may be programmed dynamically based on the type of traffic that flows through each DMA channel. In some examples, rather than software programming of the timers, a software program may write terminal count registers during boot. In some examples, the timer circuitry 608 may manage multiple interrupts that are routed to a single timer with a round-robin queue.

In some examples, the timer circuitry 608 is instantiated by processor circuitry executing timer instructions and/or configured to perform operations such as those represented by the flowchart of FIGS. 9-10.

In some examples, the interrupt batching and moderation circuitry 102 includes means for timing transmission of interrupts. For example, the means for arbitrating interrupts may be implemented by the timer circuitry 608. In some examples, the interrupt arbitration circuitry 602 may be instantiated by processor circuitry such as the example processor circuitry 1112 of FIG. 11. For instance, the interrupt arbitration circuitry 602 may be instantiated by the example microprocessor 1200 of FIG. 12 executing machine executable instructions such as those implemented by at least blocks 910, 912, 914 of FIG. 9. In some examples, the interrupt arbitration circuitry 602 may be instantiated by hardware logic circuitry, which may be implemented by an ASIC, XPU, or the FPGA circuitry 1300 of FIG. 13 structured to perform operations corresponding to the machine readable instructions. Additionally or alternatively, the timer circuitry 608 may be instantiated by any other combination of hardware, software, and/or firmware. For example, the timer circuitry 608 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example interrupt batching and moderation circuitry 102 includes example interrupt vector lookup table circuitry 610. The interrupt vector lookup table circuitry 610 associates a list of interrupt handlers with a list of interrupt requests in a table. Each entry of the interrupt vector table, called an interrupt vector, is the address of an interrupt handler.

In some examples, the interrupt vector lookup table circuitry 610 is instantiated by processor circuitry executing interrupt vector lookup instructions and/or configured to perform operations such as those represented by the flowcharts of FIGS. 9-10.

some examples, the interrupt batching and moderation circuitry 102 includes means for associating an interrupt handler with an interrupt request. For example, the means for associating an interrupt handler with an interrupt request may be implemented by the interrupt vector lookup table circuitry 610. In some examples, the interrupt vector lookup table circuitry 610 may be instantiated by processor circuitry such as the example processor circuitry 1112 of FIG. 11. For instance, the interrupt vector lookup table circuitry 610 may be instantiated by the example microprocessor 1200 of FIG. 12 executing machine executable instructions such as those implemented by at least blocks 902, 904, and 906 of FIG. 9. In some examples, the interrupt vector lookup table circuitry 610 may be instantiated by hardware logic circuitry, which may be implemented by an ASIC, XPU, or the FPGA circuitry 1300 of FIG. 13 structured to perform operations corresponding to the machine readable instructions. Additionally or alternatively, the interrupt vector lookup table circuitry 610 may be instantiated by any other combination of hardware, software, and/or firmware. For example, the interrupt vector lookup table circuitry 610 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

Figure 7:
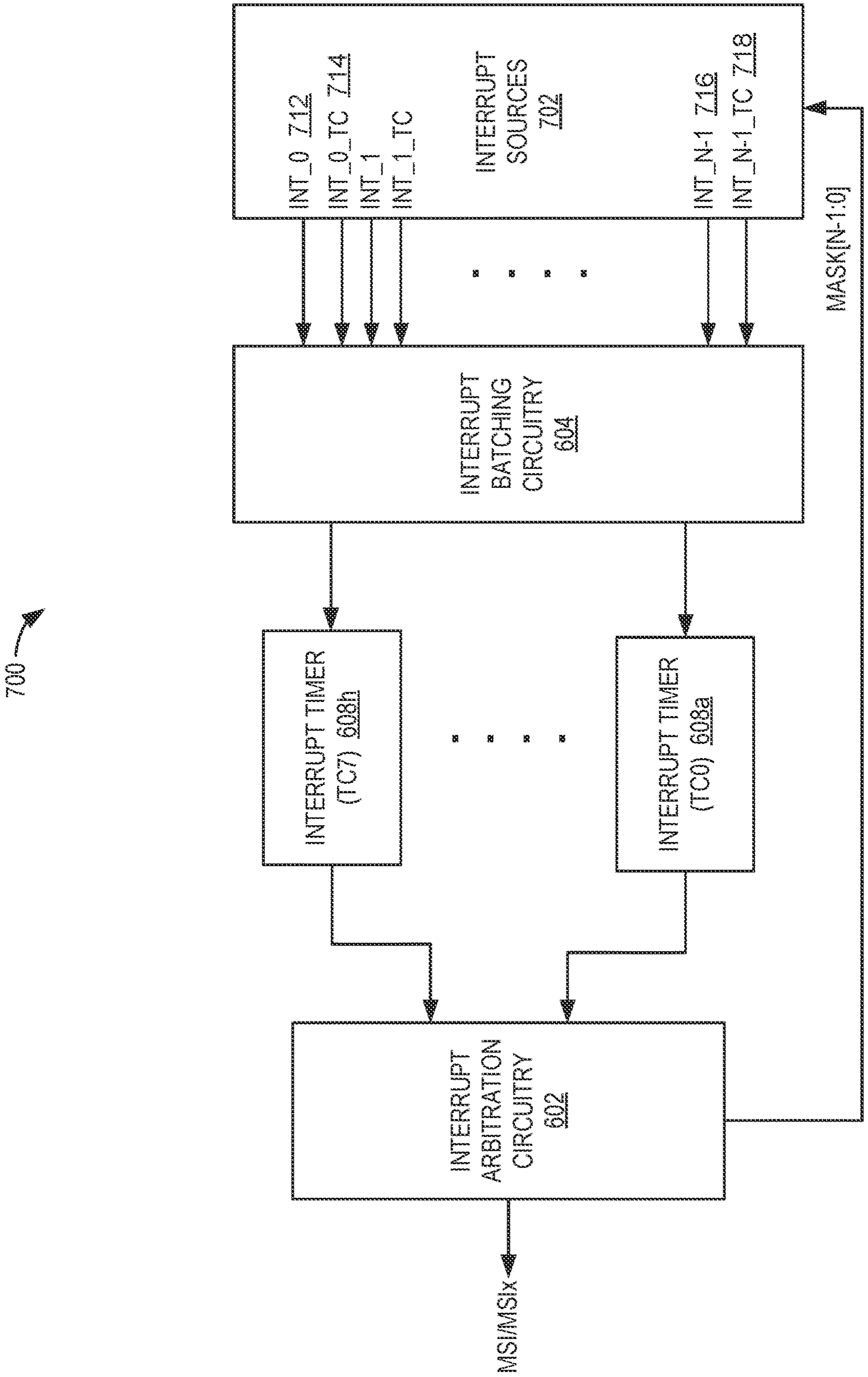
FIG. 7 is another block diagram of circuitry to batch and arbitrate interrupts.

FIG. 7 is another example illustration of the interrupt batching and moderation circuitry 102. In the example of FIG. 7, interrupts generally flow from right to left through the system 700, starting at interrupt sources 702 and ending at the interrupt arbitration circuitry 602.

The example interrupt sources 702 include a zeroth interrupt int_0 702 and an associated zeroth interrupt traffic class int_0_TC 714. The example INT-N-1 716 corresponds to a 128th interrupt in the example architecture 700 of FIG. 7 and is associated with the example n−1 interrupt INT_N-1_TC 718.

The example interrupt batching circuitry 604 routes interrupts 0 to 127 to a respective interrupt timer 608*a-h* based on the interrupt traffic class. The interrupt timers 608*a-h* are interrupt timers that correspond to the eight traffic classes of the IEEE 802.1Q standard. Thus, although the interrupt sources 702 include 128 channels, the 128 interrupts are routed to just the eight interrupt timers 608*a-h*. In some examples, generic interrupts are classified as low priority and mapped to traffic class zero.

In the example system 700, the first interrupt timer (TC0) 608*a* may be programmed with a value that is greater than a value of the eighth interrupt timer 608*h*. For example, the eighth interrupt timer (TC7) 608*h* may be programmed with a zero value, bypassing interrupt throttling. The first interrupt timer (TC0) 608*a* may be programmed to have a 10 microsecond delay to throttle traffic of lesser priority. Thus, the interrupt batching circuitry 604 groups interrupts based on an associated traffic class and uses a shared throttling timer across interrupts that belong to the same traffic class.

The example interrupt timers 608*a-h* transmit interrupts to the example interrupt arbitration circuitry 602. The example interrupt arbitration circuitry 602 may arbitrate the example interrupt timers 608*a-h* in based on a strict priority in which the interrupts from higher priority timers (e.g., the eighth timer 608*h*) are selected when there are multiple interrupts pending.

FIG. 8 is a table 800 illustrating example traffic class priorities and associated data. The example table 800 includes a traffic class column 802, a priority field column 804, a traffic type column 806, and a color coding column 808. The example interrupt batching and moderation circuitry 102 of FIG. 6 decodes PCP fields of the packets and decodes these fields into traffic classes as illustrated in the traffic class column 802.

A first row of the example table 800 shows that the traffic class TC7 810 is associated with fields 810-816 (e.g., PCP6, an isochronous traffic type, and a red color). For example, PCP6 812 is decoded as traffic class 7 and has a highest priority of the traffic classes illustrated in the traffic class column 802. Packets in the TC7 class 810 are treated as low latency interrupts and forwarded with a highest priority. The color coding of column 808 may be used in merging different traffic types. For example, when multiple traffic types are received, the interrupt batching and moderation circuitry 102 of FIG. 6 may schedule and prioritize important traffic and data based on a color coding of the traffic (e.g., such that switches and NICs can satisfy QoS requirement).

In contrast, PCP1 820 is decoded and associated with TC1 818. Data of TC1 is treated as relatively lower priority than data of TC7 and is significantly moderated by masking generation of interrupts for a threshold time after a first interrupt of TC1 818 is received.

While an example manner of implementing the interrupt batching and moderation circuitry 102 of FIGS. 1-5 is illustrated in FIG. 6, one or more of the elements, processes, and/or devices illustrated in FIG. 6 may be combined, divided, re-arranged, omitted, eliminated, and/or implemented in any other way. Further, the example interrupt arbitration circuitry 602, the example interrupt batching circuitry 604, the example interrupt to CPU mapping circuitry 606, the example timer circuitry 608, the example interrupt vector lookup table circuitry 610 and/or, more generally, the example interrupt batching and moderation circuitry 102 of FIG. 1, may be implemented by hardware alone or by hardware in combination with software and/or firmware. Thus, for example, any of the example interrupt arbitration circuitry 602, the example interrupt batching circuitry 604, the example interrupt to CPU mapping circuitry 606, the example timer circuitry 608, the example interrupt vector lookup table circuitry 610 and/or, more generally, the example interrupt batching and moderation circuitry 102 of FIG. 1, could be implemented by processor circuitry, analog circuit(s), digital circuit(s), logic circuit(s), programmable processor(s), programmable microcontroller (s), graphics processing unit(s) (GPU(s)), digital signal processor(s) (DSP(s)), application specific integrated circuit (s) (ASIC(s)), programmable logic device(s) (PLD(s)), and/ or field programmable logic device(s) (FPLD(s)) such as Field Programmable Gate Arrays (FPGAs). Further still, the example interrupt batching and moderation circuitry 102 of FIG. 1 may include one or more elements, processes, and/or devices in addition to, or instead of, those illustrated in FIG. 6, and/or may include more than one of any or all of the illustrated elements, processes and devices.

A flowchart representative of example machine readable instructions, which may be executed to configure processor circuitry to implement the interrupt batching and moderation circuitry 102 of FIGS. 1-6, is shown in FIGS. 9-10. The machine readable instructions may be one or more executable programs or portion(s) of an executable program for execution by processor circuitry, such as the processor circuitry 1112 shown in the example processor platform 1100 discussed below in connection with FIG. 11 and/or the example processor circuitry discussed below in connection with FIGS. 12 and/or 13. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIGS. 9-10, many other methods of implementing the example interrupt batching and moderation circuitry 102 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 9-10 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., “a”, “an”, “first”, “second”, etc.) do not exclude a plurality. The term “a” or “an” object, as used herein, refers to one or more of that object. The terms “a” (or “an”), “one or more”, and “at least one” are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 9 is a flowchart representative of example machine readable instructions and/or example operations 900 that may be executed and/or instantiated by processor circuitry to batching and moderate interrupts in one or more processing units. The machine readable instructions and/or the operations 900 of FIG. 9 begin at block 902, at which the example interrupt batching and moderation circuitry 102 of FIG. 6 transfers packet data for transmission by a DMA access to memory and a transfer of the data to a local NIC buffer. The example interrupt batching and moderation circuitry 102 of FIG. 6 may receive an interrupt for a direct memory access to transfer a packet. In some examples, the interrupt batching and moderation circuitry 102 of FIG. 6 may manage a plurality of CPUs and execute instructions to send a wakeup signal to a second compute unit of the plurality of compute units, the second compute unit in a deeper sleep state than the first compute unit.

At block 904, the example interrupt batching circuitry 604 of FIG. 6 decodes a priority field in packet. In some examples the priority field is included in a data header of the packet and the priority field is decoded into one of eight traffic classes that correspond to eight priority code point fields. In some examples, the packet is associated with more or less than eight priority code point fields. For example, an example system for managing interrupts may include only four interrupts. In some examples, the interrupt batching and moderation circuitry 102 of FIG. 6 may receive a traffic class associated with the packet without needing to decode the packet.

At block 906, the example interrupt batching and moderation circuitry 102 of FIG. 6 transmits the packet. At block 908, the example interrupt batching and moderation circuitry 102 of FIG. 6 generates an interrupt. Then at block 910, the example interrupt batching circuitry 604 of FIG. 6 associates the interrupts with a traffic class based on the priority field. For example, a PCP 6 priority field may be decoded to a TC7 traffic class and an isochronous traffic type. At block 912, the example interrupt batching circuitry 604 of FIG. 6 routes the interrupt to an interrupt timer based on the traffic class. At block 914, the example timer circuitry 608 of FIG. 6 may mask subsequent interrupts transmitted to the interrupt timer for a threshold period. For example, the timer circuitry 608 of FIG. 6 may receive a first interrupt with associated traffic class data indicating the first interrupt is of traffic class TC1. Then, the example timer circuitry 608 of FIG. 6 may mask interrupts for a threshold period of time before subsequent interrupts are transmitted.

At block 916, the example timer circuitry 608 of FIG. 6 determines if the threshold period is complete. If not, then the threshold masking period is still in progress and control is transferred to block 914. If so, the example timer circuitry 608 of FIG. 6 transmits the interrupt to the interrupt arbitration circuitry 602 of FIG. 6. Finally, at block 918, the example interrupt arbitration circuitry 602 of FIG. 6 transmits an interrupt to an example CPU. The instructions 900 end. The instructions 900 may be triggered when additional interrupts are received.

FIG. 10 is a flowchart representative of example machine readable instructions and/or example operations 1000 that may be executed and/or instantiated by processor circuitry to batch and moderate interrupts in a plurality of compute units. The example instructions 1000 begin at block 1002 at which the example interrupt batching and moderation circuitry 102 of FIG. 6 receives an interrupt. At block 1006, the example interrupt batching circuitry 604 of FIG. 6 determines if the interrupt can be serviced by an accelerator compute unit. For example, the interrupt batching and moderation circuitry 102 of FIG. 6 may direct the interrupt to an accelerator compute unit when a first set of CPUs are in a C-state that reduces or stops selected functions.

At block 1008, the example interrupt batching circuitry 604 of FIG. 6 determines if an interrupt can be serviced by a CPU in a lowest sleep state. For example, some interrupts may be able to be processed by a uCPU 408 of FIG. 4. Then, the interrupt batching circuitry 604 of FIG. 6 can micro-batch a number of interrupts and periodically hand them off to the uCPU 408 of FIG. 4. At block 1010, the example interrupt batching circuitry 604 of FIG. 6 identifies a CPU in higher sleep state capable of executing interrupts.

At block 1012, the example interrupt batching circuitry 604 of FIG. 6 transmits an interrupt to compute unit in minimum appropriate sleep state. For example, the uCPU 408 of FIG. 6 may to absorb a first series of interrupts, while a second series of interrupts may be redirecting micro-batches of interrupts to a second level CPU if activity ramps further At block 1014, the example interrupt batching and moderation circuitry 102 of FIG. 6 executes the interrupts. At block 1016, the example interrupt arbitration circuitry 602 of FIG. 6 determines if there is another interrupt. If so, control is transferred to block 1006. If not, the instructions 1000 end.

Figure 11:
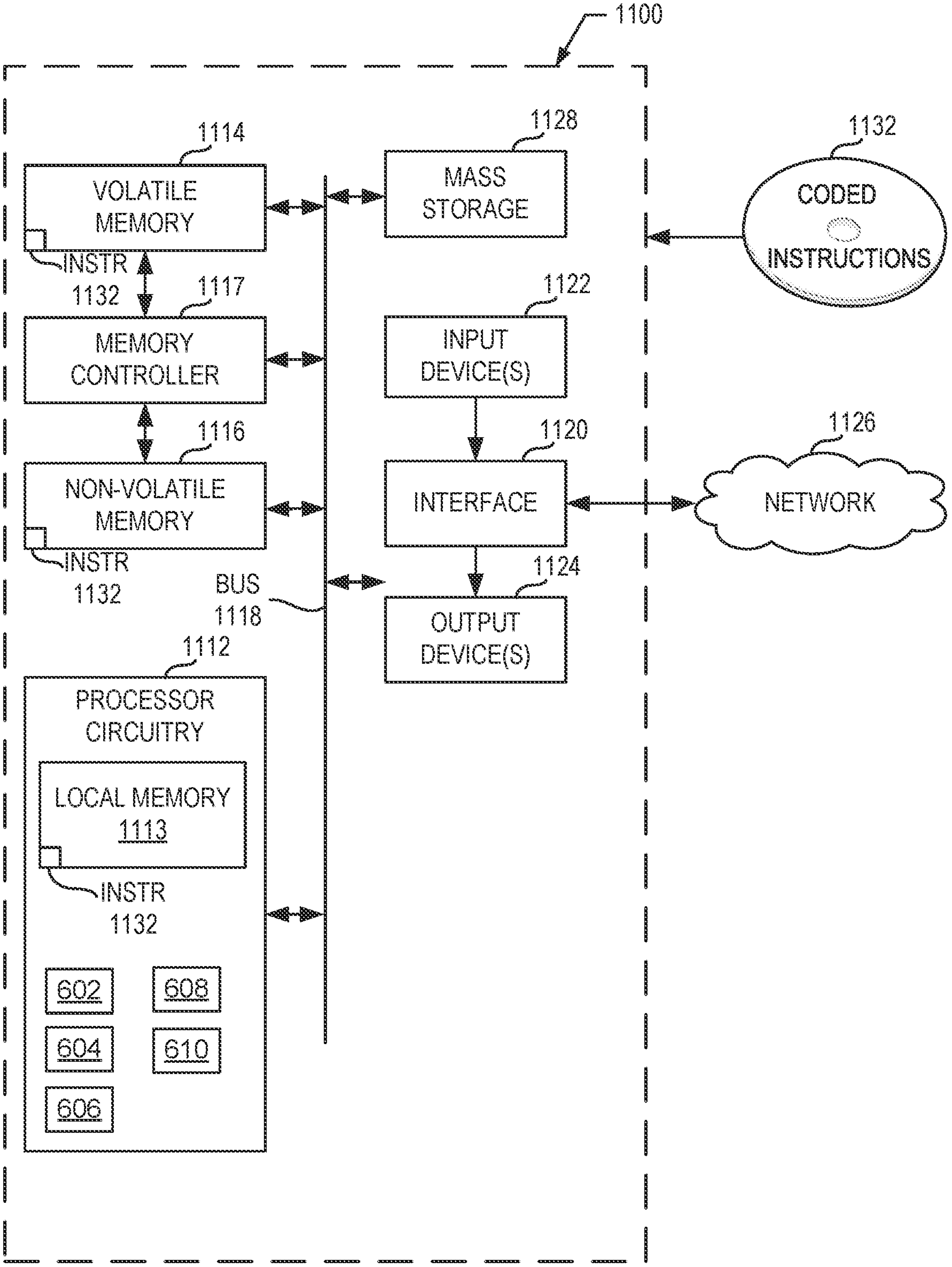
FIG. 11 is a block diagram of an example processing platform including processor circuitry structured to execute the example machine readable instructions and/or the example operations of FIGS. 9-10 to implement the interrupt batching and moderation circuitry of FIGS. 1-7.

FIG. 11 is a block diagram of an example processor platform 1100 structured to execute and/or instantiate the machine readable instructions and/or the operations of FIGS. 9-10 to implement the interrupt batching and moderation circuitry 102 of FIGS. 1-6. The processor platform 1100 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1100 of the illustrated example includes processor circuitry 1112. The processor circuitry 1112 of the illustrated example is hardware. For example, the processor circuitry 1112 can be implemented by one or more integrated circuits, logic circuits, FPGAs, microprocessors, CPUs, GPUs, DSPs, and/or microcontrollers from any desired family or manufacturer. The processor circuitry 1112 may be implemented by one or more semiconductor based (e.g., silicon based) devices. In this example, the processor circuitry 1112 implements the example interrupt arbitration circuitry 602, the example interrupt batching circuitry 604, the example interrupt to CPU mapping circuitry 606, the example timer circuitry 608, and the example interrupt vector lookup table circuitry 610.

The processor circuitry 1112 of the illustrated example includes a local memory 1113 (e.g., a cache, registers, etc.). The processor circuitry 1112 of the illustrated example is in communication with a main memory including a volatile memory 1114 and a non-volatile memory 1116 by a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1116 may be implemented by flash memory and/or any other desired type of memory device. Access to the main memory 1114, 1116 of the illustrated example is controlled by a memory controller 1117.

The processor platform 1100 of the illustrated example also includes interface circuitry 1120. The interface circuitry 1120 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1122 are connected to the interface circuitry 1120. The input device(s) 1122 permit(s) a user to enter data and/or commands into the processor circuitry 1112. The input device(s) 1122 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1124 are also connected to the interface circuitry 1120 of the illustrated example. The output device(s) 1124 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1120 of the illustrated example, thus, typically includes a graphics driver card, a graphics driver chip, and/or graphics processor circuitry such as a GPU.

The interface circuitry 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1126. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1100 of the illustrated example also includes one or more mass storage devices 1128 to store software and/or data. Examples of such mass storage devices 1128 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 1132, which may be implemented by the machine readable instructions of FIGS. 9-10, may be stored in the mass storage device 1128, in the volatile memory 1114, in the non-volatile memory 1116, and/or on a removable non-transitory computer readable storage medium such as a CD or DVD.

Figure 12:
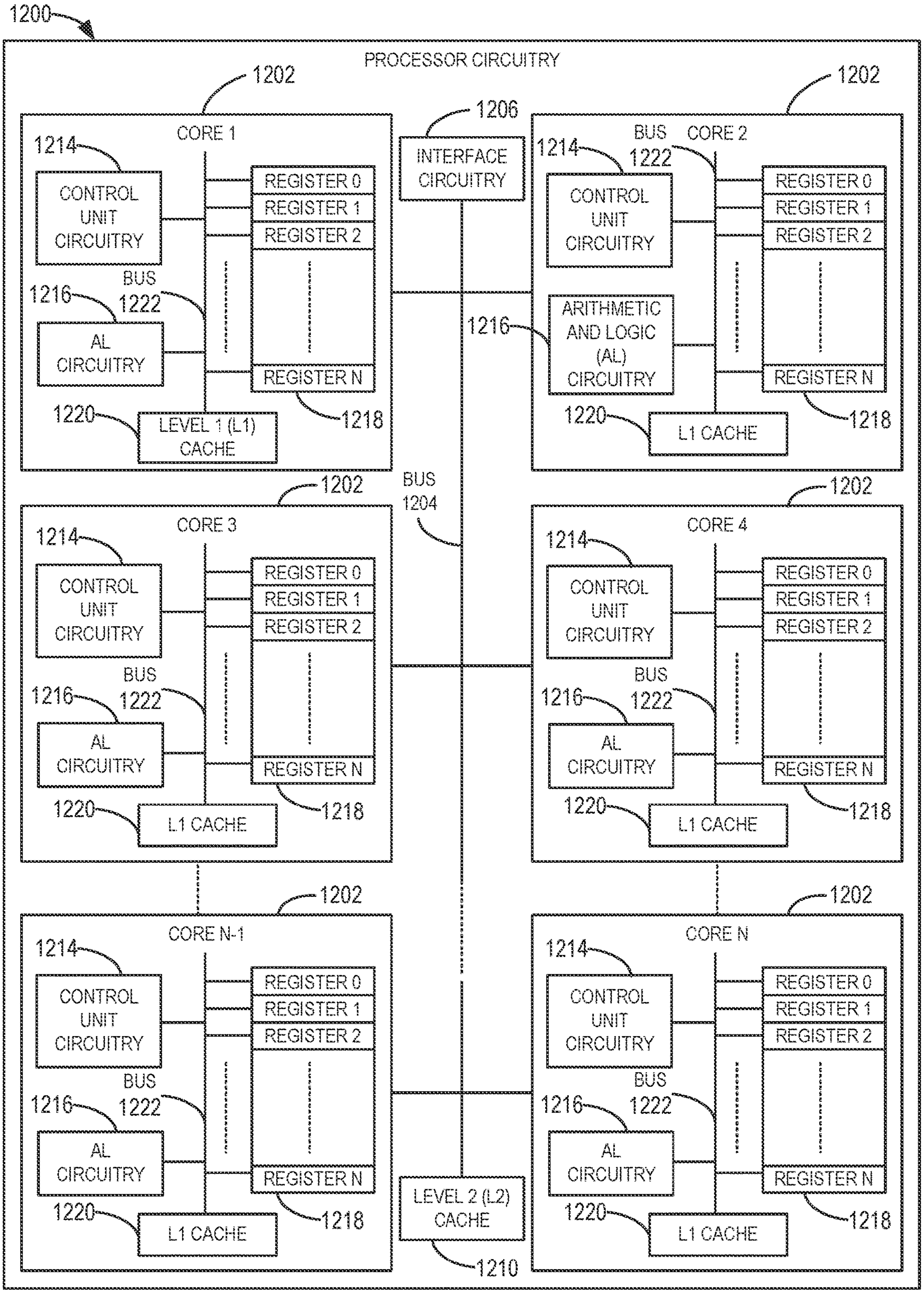
FIG. 12 is a block diagram of an example implementation of the processor circuitry of FIG. 11.

FIG. 12 is a block diagram of an example implementation of the processor circuitry 1112 of FIG. 11. In this example, the processor circuitry 1112 of FIG. 11 is implemented by a microprocessor 1200. For example, the microprocessor 1200 may be a general purpose microprocessor (e.g., general purpose microprocessor circuitry). The microprocessor 1200 executes some or all of the machine readable instructions of the flowcharts of FIGS. 9-10 to effectively instantiate the circuitry of FIG. 6 as logic circuits to perform the operations corresponding to those machine readable instructions. In some such examples, the circuitry of FIG. 6 is instantiated by the hardware circuits of the microprocessor 1200 in combination with the instructions. For example, the microprocessor 1200 may be implemented by multi-core hardware circuitry such as a CPU, a DSP, a GPU, an XPU, etc. Although it may include any number of example cores 1202 (e.g., 1 core), the microprocessor 1200 of this example is a multi-core semiconductor device including N cores. The cores 1202 of the microprocessor 1200 may operate independently or may cooperate to execute machine readable instructions. For example, machine code corresponding to a firmware program, an embedded software program, or a software program may be executed by one of the cores 1202 or may be executed by multiple ones of the cores 1202 at the same or different times. In some examples, the machine code corresponding to the firmware program, the embedded software program, or the software program is split into threads and executed in parallel by two or more of the cores 1202. The software program may correspond to a portion or all of the machine readable instructions and/or operations represented by the flowchart of FIGS. 9-10.

The cores 1202 may communicate by a first example bus 1204. In some examples, the first bus 1204 may be implemented by a communication bus to effectuate communication associated with one(s) of the cores 1202. For example, the first bus 1204 may be implemented by at least one of an Inter-Integrated Circuit (I2C) bus, a Serial Peripheral Interface (SPI) bus, a PCI bus, or a PCIe bus. Additionally or alternatively, the first bus 1204 may be implemented by any other type of computing or electrical bus. The cores 1202 may obtain data, instructions, and/or signals from one or more external devices by example interface circuitry 1206. The cores 1202 may output data, instructions, and/or signals to the one or more external devices by the interface circuitry 1206. Although the cores 1202 of this example include example local memory 1220 (e.g., Level 1 (L1) cache that may be split into an L1 data cache and an L1 instruction cache), the microprocessor 1200 also includes example shared memory 1210 that may be shared by the cores (e.g., Level 2 (L2 cache)) for high-speed access to data and/or instructions. Data and/or instructions may be transferred (e.g., shared) by writing to and/or reading from the shared memory 1210. The local memory 1220 of each of the cores 1202 and the shared memory 1210 may be part of a hierarchy of storage devices including multiple levels of cache memory and the main memory (e.g., the main memory 1114, 1116 of FIG. 11). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1202 may be referred to as a CPU, DSP, GPU, etc., or any other type of hardware circuitry. Each core 1202 includes control unit circuitry 1214, arithmetic and logic (AL) circuitry (sometimes referred to as an ALU) 1216, a plurality of registers 1218, the local memory 1220, and a second example bus 1222. Other structures may be present. For example, each core 1202 may include vector unit circuitry, single instruction multiple data (SIMD) unit circuitry, load/store unit (LSU) circuitry, branch/jump unit circuitry, floating-point unit (FPU) circuitry, etc. The control unit circuitry 1214 includes semiconductor-based circuits structured to control (e.g., coordinate) data movement within the corresponding core 1202. The AL circuitry 1216 includes semiconductor-based circuits structured to perform one or more mathematic and/or logic operations on the data within the corresponding core 1202. The AL circuitry 1216 of some examples performs integer based operations. In other examples, the AL circuitry 1216 also performs floating point operations. In yet other examples, the AL circuitry 1216 may include first AL circuitry that performs integer based operations and second AL circuitry that performs floating point operations. In some examples, the AL circuitry 1216 may be referred to as an Arithmetic Logic Unit (ALU). The registers 1218 are semiconductor-based structures to store data and/or instructions such as results of one or more of the operations performed by the AL circuitry 1216 of the corresponding core 1202. For example, the registers 1218 may include vector register(s), SIMD register(s), general purpose register(s), flag register(s), segment register(s), machine specific register(s), instruction pointer register(s), control register(s), debug register(s), memory management register(s), machine check register(s), etc. The registers 1218 may be arranged in a bank as shown in FIG. 12. Alternatively, the registers 1218 may be organized in any other arrangement, format, or structure including distributed throughout the core 1202 to shorten access time. The second bus 1222 may be implemented by at least one of an I2C bus, a SPI bus, a PCI bus, or a PCIe bus Each core 1202 and/or, more generally, the microprocessor 1200 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1200 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 13:
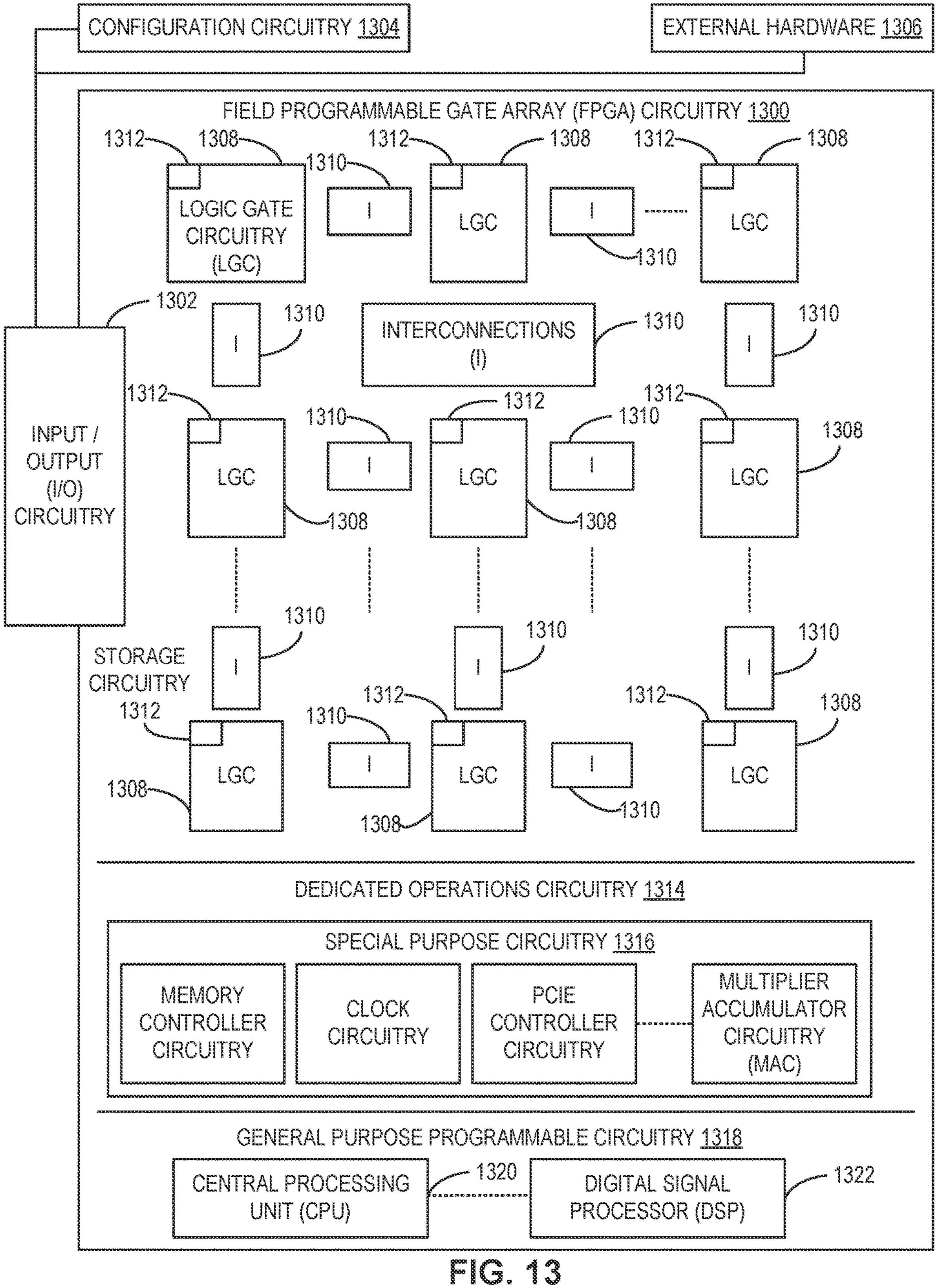
FIG. 13 is a block diagram of another example implementation of the processor circuitry of FIG. 11.

FIG. 13 is a block diagram of another example implementation of the processor circuitry 1112 of FIG. 11. In this example, the processor circuitry 1112 is implemented by FPGA circuitry 1300. For example, the FPGA circuitry 1300 may be implemented by an FPGA. The FPGA circuitry 1300 can be used, for example, to perform operations that could otherwise be performed by the example microprocessor 1200 of FIG. 12 executing corresponding machine readable instructions. However, once configured, the FPGA circuitry 1300 instantiates the machine readable instructions in hardware and, thus, can often execute the operations faster than they could be performed by a general purpose microprocessor executing the corresponding software.

More specifically, in contrast to the microprocessor 1200 of FIG. 12 described above (which is a general purpose device that may be programmed to execute some or all of the machine readable instructions represented by the flowchart of FIGS. 9-10 but whose interconnections and logic circuitry are fixed once fabricated), the FPGA circuitry 1300 of the example of FIG. 13 includes interconnections and logic circuitry that may be configured and/or interconnected in different ways after fabrication to instantiate, for example, some or all of the machine readable instructions represented by the flowcharts of FIGS. 9-10. In particular, the FPGA circuitry 1300 may be thought of as an array of logic gates, interconnections, and switches. The switches can be programmed to change how the logic gates are interconnected by the interconnections, effectively forming one or more dedicated logic circuits (unless and until the FPGA circuitry 1300 is reprogrammed). The configured logic circuits enable the logic gates to cooperate in different ways to perform different operations on data received by input circuitry. Those operations may correspond to some or all of the software represented by the flowcharts of FIGS. 9-10. As such, the FPGA circuitry 1300 may be structured to effectively instantiate some or all of the machine readable instructions of the flowchart of FIGS. 9-10 as dedicated logic circuits to perform the operations corresponding to those software instructions in a dedicated manner analogous to an ASIC. Therefore, the FPGA circuitry 1300 may perform the operations corresponding to the some or all of the machine readable instructions of FIGS. 9-10 faster than the general purpose microprocessor can execute the same.

In the example of FIG. 13, the FPGA circuitry 1300 is structured to be programmed (and/or reprogrammed one or more times) by an end user by a hardware description language (HDL) such as Verilog. The FPGA circuitry 1300 of FIG. 13, includes example input/output (I/O) circuitry 1302 to obtain and/or output data to/from example configuration circuitry 1304 and/or external hardware 1306. For example, the configuration circuitry 1304 may be implemented by interface circuitry that may obtain machine readable instructions to configure the FPGA circuitry 1300, or portion(s) thereof. In some such examples, the configuration circuitry 1304 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1306 may be implemented by external hardware circuitry. For example, the external hardware 1306 may be implemented by the microprocessor 1200 of FIG. 12. The FPGA circuitry 1300 also includes an array of example logic gate circuitry 1308, a plurality of example configurable interconnections 1310, and example storage circuitry 1312. The logic gate circuitry 1308 and the configurable interconnections 1310 are configurable to instantiate one or more operations that may correspond to at least some of the machine readable instructions of FIGS. 9-10 and/or other desired operations. The logic gate circuitry 1308 shown in FIG. 13 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1308 to enable configuration of the electrical structures and/or the logic gates to form circuits to perform desired operations. The logic gate circuitry 1308 may include other electrical structures such as look-up tables (LUTs), registers (e.g., flip-flops or latches), multiplexers, etc.

The configurable interconnections 1310 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1308 to program desired logic circuits.

The storage circuitry 1312 of the illustrated example is structured to store result(s) of the one or more of the operations performed by corresponding logic gates. The storage circuitry 1312 may be implemented by registers or the like. In the illustrated example, the storage circuitry 1312 is distributed amongst the logic gate circuitry 1308 to facilitate access and increase execution speed.

The example FPGA circuitry 1300 of FIG. 13 also includes example Dedicated Operations Circuitry 1314. In this example, the Dedicated Operations Circuitry 1314 includes special purpose circuitry 1316 that may be invoked to implement commonly used functions to avoid the need to program those functions in the field. Examples of such special purpose circuitry 1316 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1300 may also include example general purpose programmable circuitry 1318 such as an example CPU 1320 and/or an example DSP 1322. Other general purpose programmable circuitry 1318 may additionally or alternatively be present such as a GPU, an XPU, etc., that can be programmed to perform other operations.

Although FIGS. 12 and 13 illustrate two example implementations of the processor circuitry 1112 of FIG. 11, many other approaches are contemplated. For example, as mentioned above, modern FPGA circuitry may include an on-board CPU, such as one or more of the example CPU 1320 of FIG. 13. Therefore, the processor circuitry 1112 of FIG. 11 may additionally be implemented by combining the example microprocessor 1200 of FIG. 12 and the example FPGA circuitry 1300 of FIG. 13. In some such hybrid examples, a first portion of the machine readable instructions represented by the flowcharts of FIGS. 9-10 may be executed by one or more of the cores 1202 of FIG. 12, a second portion of the machine readable instructions represented by the flowcharts of FIGS. 9-10 may be executed by the FPGA circuitry 1300 of FIG. 13, and/or a third portion of the machine readable instructions represented by the flowcharts of FIGS. 9-10 may be executed by an ASIC. It should be understood that some or all of the circuitry of FIG. 6 may, thus, be instantiated at the same or different times. Some or all of the circuitry may be instantiated, for example, in one or more threads executing concurrently and/or in series. Moreover, in some examples, some or all of the circuitry of FIG. 6 may be implemented within one or more virtual machines and/or containers executing on the microprocessor.

In some examples, the processor circuitry 1112 of FIG. 11 may be in one or more packages. For example, the microprocessor 1200 of FIG. 12 and/or the FPGA circuitry 1300 of FIG. 13 may be in one or more packages. In some examples, an XPU may be implemented by the processor circuitry 1112 of FIG. 11, which may be in one or more packages. For example, the XPU may include a CPU in one package, a DSP in another package, a GPU in yet another package, and an FPGA in still yet another package.

Figure 14:
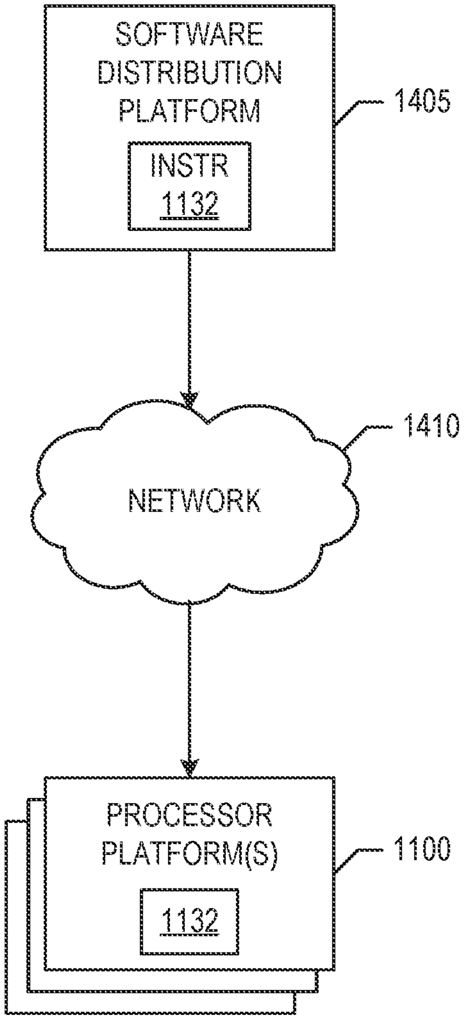
FIG. 14 is a block diagram of an example software distribution platform (e.g., one or more servers) to distribute software (e.g., software corresponding to the example machine readable instructions of FIGS. 9-10) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1405 to distribute software such as the example machine readable instructions 1132 of FIG. 11 to hardware devices owned and/or operated by third parties is illustrated in FIG. 14. The example software distribution platform 1405 may be implemented by any computer server, data facility, cloud service, etc., capable of storing and transmitting software to other computing devices. The third parties may be customers of the entity owning and/or operating the software distribution platform 1405. For example, the entity that owns and/or operates the software distribution platform 1405 may be a developer, a seller, and/or a licensor of software such as the example machine readable instructions 1132 of FIG. 11 The third parties may be consumers, users, retailers, OEMs, etc., who purchase and/or license the software for use and/or re-sale and/or sub-licensing. In the illustrated example, the software distribution platform 1405 includes one or more servers and one or more storage devices. The storage devices store the machine readable instructions 1132, which may correspond to the example machine readable instructions 900, 1000 of FIGS. 9-10, as described above. The one or more servers of the example software distribution platform 1405 are in communication with an example network 1410, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1132 from the software distribution platform 1405. For example, the software, which may correspond to the example machine readable instructions 1100 of FIG. 11, may be downloaded to the example processor platform 1100, which is to execute the machine readable instructions 1132 to implement the interrupt batching and moderation circuitry 102. In some examples, one or more servers of the software distribution platform 1405 periodically offer, transmit, and/or force updates to the software (e.g., the example machine readable instructions 1132 of FIG. 11) to ensure improvements, patches, updates, etc., are distributed and applied to the software at the end user devices.

From the foregoing, it will be appreciated that example systems, methods, apparatus, and articles of manufacture have been disclosed that manage processor interrupts. Disclosed systems, methods, apparatus, and articles of manufacture improve the efficiency of using a computing device by moderating and batching interrupts based on priority field of the associated packet. Disclosed examples efficiently use limited integrated circuit chip space and do not require hardware resources to be managed by software, thereby reducing processing overhead. Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to manage processor interrupts are disclosed herein. Further examples and combinations thereof include the following:

Example 1 includes an apparatus comprising at least one memory, instructions, and processor circuitry to execute the instructions to receive an interrupt for a direct memory access to transfer a packet, decode a priority field in the packet to associate the interrupt with a traffic class, route the interrupt to an interrupt timer based on the traffic class, the interrupt timer to mask interrupts transmitted to the interrupt timer for a threshold period after receiving the interrupt, and send the interrupt after the threshold period.

Example 2 includes the apparatus of any of the previous examples, wherein the interrupt timer is a first interrupt timer of a plurality of interrupt timers that transmits interrupts to a strict priority interrupt arbiter.

Example 3 includes the apparatus of any of the previous examples, wherein each timer of the plurality of interrupt timers is associated with a different threshold period, and wherein the processor circuitry is to execute the instructions to change the threshold period of the first interrupt timer.

Example 4 includes the apparatus of any of the previous examples, wherein the priority field is included in a data header of the packet and the priority field is decoded into one of eight traffic classes that correspond to eight priority code point fields.

Example 5 includes the apparatus of any of the previous examples, wherein a second timer of the plurality of interrupt timers is associated with a second threshold masking period that is longer than the threshold period of the first interrupt timer, the first interrupt timer associated with higher priority interrupts than the second timer.

Example 6 includes the apparatus of any of the previous examples, wherein the processor circuitry is to execute the instructions to send the interrupt to a first compute unit of a plurality of compute units, the first compute unit selected based on a sleep state of the first compute unit.

Example 7 includes the apparatus of any of the previous examples, the processor circuitry is to execute the instructions to send a wakeup signal a second compute unit of the plurality of compute units, the second compute unit in a deeper sleep state than the first compute unit.

Example 8 includes a computer readable medium comprising instructions which, when executed by processor circuitry, cause the processor circuitry to receive an interrupt for a direct memory access to transfer a packet, decode a priority field in the packet to associate the interrupt with a traffic class, route the interrupt to an interrupt timer based on the traffic class, the interrupt timer to mask interrupts transmitted to the interrupt timer for a threshold period after receiving the interrupt, and send the interrupt after the threshold period.

Example 9 includes the computer readable medium of any of the previous examples, wherein the interrupt timer is a first interrupt timer of a plurality of interrupt timers that transmits interrupts to a strict priority interrupt arbiter.

Example 10 includes the computer readable medium of any of the previous examples, wherein each timer of the plurality of interrupt timers is associated with a different threshold period, and wherein the instructions, when executed, cause the processor circuitry to change the threshold period of the first interrupt timer.

Example 11 includes the computer readable medium of any of the previous examples, wherein the priority field is included in a data header of the packet and the priority field is decoded into one of eight traffic classes that correspond to eight priority code point fields.

Example 12 includes the computer readable medium of any of the previous examples, wherein a second timer of the plurality of interrupt timers is associated with a second threshold masking period that is longer than the threshold period of the first interrupt timer, the first interrupt timer associated with higher priority interrupts than the second timer.

Example 13 includes the computer readable medium of any of the previous examples, wherein the instructions, when executed, cause the processor circuitry to send the interrupt to a first compute unit of a plurality of compute units, the first compute unit selected based on a sleep state of the first compute unit.

Example 14 includes the computer readable medium of any of the previous examples, wherein the processor circuitry is to execute the instructions to send a wakeup signal a second compute unit of the plurality of compute units, the second compute unit in a deeper sleep state than the first compute unit.

In one or more of Examples 8-14, the computer readable medium may be a non-transitory computer readable medium.

Example 15 includes a method comprising receiving, by executing an instruction with processor circuitry, an interrupt for a direct memory access to transfer a packet, decoding, by executing an instruction with the processor circuitry, a priority field in the packet to associate the interrupt with a traffic class, routing, by executing an instruction with the processor circuitry, the interrupt to an interrupt timer based on the traffic class, the interrupt timer to mask interrupts transmitted to the interrupt timer for a threshold period after receiving the interrupt, and sending, by executing an instruction with the processor circuitry, the interrupt after the threshold period.

Example 16 includes the method of any of the previous examples, wherein the interrupt timer is a first interrupt timer of a plurality of interrupt timers that transmits interrupts to a strict priority interrupt arbiter.

Example 17 includes the method of any of the previous examples, wherein each timer of the plurality of interrupt timers is associated with a different threshold period, and wherein the processor circuitry is to execute the instructions to change the threshold period of the first interrupt timer.

Example 18 includes the method of any of the previous examples, wherein the priority field is included in a data header of the packet and the priority field is decoded into one of eight traffic classes that correspond to eight priority code point fields.

Example 19 includes the method of any of the previous examples, wherein a second timer of the plurality of interrupt timers is associated with a second threshold masking period that is longer than the threshold period of the first interrupt timer, the first interrupt timer associated with higher priority interrupts than the second timer.

Example 20 includes the method of any of the previous examples, wherein the processor circuitry is to execute the instructions to send the interrupt to a first compute unit of a plurality of compute units, the first compute unit selected based on a sleep state of the first compute unit.

Example 21 includes the method of any of the previous examples, wherein the processor circuitry is to execute the instructions to send a wakeup signal a second compute unit of the plurality of compute units, the second compute unit in a deeper sleep state than the first compute unit.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. A network interface card (NIC) comprising:
at least one memory;
instructions; and
at least one processor circuit to execute the instructions to:
determine a traffic class of a packet based on a priority field in the packet;
selectively delay delivery of an interrupt based on the traffic class, wherein the interrupt is routed to a first interrupt timer of a plurality of interrupt timers that transmits interrupts to a strict priority interrupt timer; and
cause the delivery of the interrupt to a central processing unit (CPU) after the delay.

2. The NIC of claim 1, wherein each interrupt timer of the plurality of interrupt timers is associated with a different delay, and wherein the at least one processor circuit is to execute the instructions to change the delay of the first interrupt timer.

3. The NIC of claim 2, wherein the priority field is included in a data header of the packet and, to determine the traffic class of the packet, the priority field is decoded into one of eight traffic classes that correspond to one of eight priority code point fields.

4. The NIC of claim 3, wherein the delay is a first delay, and wherein a second timer of the plurality of interrupt timers is associated with a second delay that is longer than the first delay of the first interrupt timer, the first interrupt timer associated with higher priority interrupts than the second timer.

5. The NIC of claim 1, wherein the at least one processor circuit is to execute the instructions to send the interrupt to a first compute unit of a plurality of compute units of the CPU, the first compute unit selected based on a sleep state of the first compute unit.

6. The NIC of claim 5, the at least one processor circuit is to execute the instructions to send a wakeup signal to a second compute unit of the plurality of compute units of the CPU, the second compute unit in a deeper sleep state than the first compute unit.

7. A non-transitory computer readable medium comprising instructions to cause at least one processor circuit of a network interface card (NIC) to at least:
determine a traffic class of a packet based on a priority field in the packet;
selectively delay delivery of an interrupt based on the traffic class; and
cause the delivery of the interrupt to a central processing unit (CPU) after the delay, the interrupt is sent to a first compute unit of a plurality of compute units of the CPU, the first compute unit selected based on a sleep state of the first compute unit.

8. The non-transitory computer readable medium of claim 7, wherein the interrupt is routed to a first interrupt timer of a plurality of interrupt timers that transmits interrupts to a strict priority interrupt arbiter.

9. The non-transitory computer readable medium of claim 8, wherein each interrupt timer of the plurality of interrupt timers is associated with a different delay, and wherein the instructions, when executed, cause the at least one processor circuit to change the delay of the first interrupt timer.

10. The non-transitory computer readable medium of claim 9, wherein the priority field is included in a data header of the packet and, to determine the traffic class of the packet, the priority field is decoded into one of eight traffic classes that correspond to one of eight priority code point fields.

11. The non-transitory computer readable medium of claim 10, wherein the delay is a first delay, and wherein a second timer of the plurality of interrupt timers is associated with a second delay that is longer than the first delay of the first interrupt timer, the first interrupt timer associated with higher priority interrupts than the second timer.

12. The non-transitory computer readable medium of claim 7, wherein one or more of the at least one processor circuit is to execute the instructions to send a wakeup signal to a second compute unit of the plurality of compute units of the CPU, the second compute unit in a deeper sleep state than the first compute unit.

13. A method comprising:
determining, by executing an instruction with at least one processor circuit of a network interface card (NIC), a traffic class of a packet based on a priority field in the packet;
selectively delaying, by executing an instruction with the at least one processor circuit, delivery of an interrupt based on the traffic class, wherein the interrupt is routed to a first interrupt timer of a plurality of interrupt timers that transmits interrupts to a strict priority interrupt timer; and
causing, by executing an instruction with the at least one processor circuit, the delivery of the interrupt to a central processing unit (CPU) after the delay.

14. The method of claim 13, wherein each interrupt timer of the plurality of interrupt timers is associated with a different delay, and further including changing, by executing an instruction with the at least one processor circuit, the delay of the first interrupt timer.

15. The method of claim 14, wherein the priority field is included in a data header of the packet and determining the traffic class of the packet includes decoding the priority field into one of eight traffic classes that correspond to one of eight priority code point fields.

16. The method of claim 15, wherein the delay is a first delay, and wherein a second timer of the plurality of interrupt timers is associated with a second delay that is longer than the first delay of the first interrupt timer, the first interrupt timer associated with higher priority interrupts than the second timer.

17. The method of claim 13, including sending, by executing an instruction with the at least one processor circuit, the interrupt to a first compute unit of a plurality of compute units of the CPU, the first compute unit selected based on a sleep state of the first compute unit.

18. The method of claim 17, including sending, by executing an instruction with the at least one processor circuit, a wakeup signal to a second compute unit of the plurality of compute units of the CPU, the second compute unit in a deeper sleep state than the first compute unit.

19. An apparatus comprising:
at least one memory;
instructions; and
processor circuitry to execute the instructions to:
decode a priority field of a packet to associate an interrupt with a traffic class, wherein the priority field is included in a data header of the packet, and the priority field is decoded into one of eight traffic classes;
perform interrupt moderation to selectively delay delivery of the interrupt based on the traffic class; and cause the delivery of the interrupt to a central processing unit (CPU) after the delay, the interrupt is sent to a first compute unit of a plurality of compute units of the CPU, the first compute unit selected based on a sleep state of the first compute unit.

20. The apparatus of claim 19, wherein the interrupt is routed to a first interrupt timer of a plurality of interrupt timers that transmits interrupts to a strict priority arbiter.

21. The apparatus of claim 20, wherein each interrupt timer of the plurality of interrupt timers is associated with a different delay, and wherein the instructions, when executed, cause the at least one processor circuit to change the delay of the first interrupt timer.

22. The apparatus of claim 19, wherein one or more of the at least one processor circuit is to execute the instructions to send a wakeup signal to a second compute unit of the plurality of compute units of the CPU, the second compute unit in a deeper sleep state than the first compute unit.

* * * * *